United States Patent [19]
Kashiwagi et al.

[11] Patent Number: 6,037,939
[45] Date of Patent: *Mar. 14, 2000

[54] METHOD FOR ENABLING INTERACTIVE MANIPULATION OF DATA RETAINED IN COMPUTER SYSTEM, AND A COMPUTER SYSTEM FOR IMPLEMENTING THE METHOD

[75] Inventors: Kouichi Kashiwagi, Tenri; Mitsuru Minakuchi, Seika-cho; Toshiyuki Masui, Meguro-ku, all of Japan

[73] Assignee: Sharp Kabushiki Kaisha

[*] Notice: This patent issued on a continued prosecution application filed under 37 CFR 1.53(d), and is subject to the twenty year patent term provisions of 35 U.S.C. 154(a)(2).

[21] Appl. No.: 08/725,654

[22] Filed: Sep. 27, 1996

[30] Foreign Application Priority Data

Sep. 27, 1995 [JP] Japan .................................. 7-249979
Sep. 28, 1995 [JP] Japan .................................. 7-251384

[51] Int. Cl.[7] .................................................. G06T 3/40
[52] U.S. Cl. ........................................ 345/342; 345/439
[58] Field of Search ................................ 345/340, 341, 345/342, 339, 346, 127, 128, 129, 130, 131, 433, 439

[56] References Cited

U.S. PATENT DOCUMENTS

| | | | |
|---|---|---|---|
| 5,187,776 | 2/1993 | Yanker | 345/341 |
| 5,227,771 | 7/1993 | Kerr et al. | 345/340 |
| 5,341,466 | 8/1994 | Perlin et al. | 345/439 |
| 5,365,360 | 11/1994 | Torres | 345/348 |
| 5,565,888 | 10/1996 | Selker | 345/146 |
| 5,684,969 | 11/1997 | Ishida | 345/342 |

OTHER PUBLICATIONS

R.J. Torres, Laid–Open Patent Publication No. 5–224870, Laid–Open Patent Publ. Date: Sep. 3, 1993.

*Primary Examiner*—Crescelle N. dela Torre
*Attorney, Agent, or Firm*—David G. Conlin; Richard E. Gamache

[57] ABSTRACT

A method for enabling a user to interactively manipulate data retained in a computer system includes the steps of: comparing a variable value with a predetermined threshold value, the variable value varying in accordance with a predetermined instruction which is input to the computer system; selecting one of a plurality of interaction tools in accordance with the result of comparison of the variable value with the predetermined threshold value, each of the plurality of interaction tools providing a different method for manipulating the same data; and displaying the selected one of the plurality of interaction tools.

14 Claims, 24 Drawing Sheets

FIG. 9

| Mouse left button | Select object at cursor |
|---|---|
| Mouse left button + mouse drag | Move object |
| Mouse middle button | Scroll graphics in the direction of cursor movement |
| Mouse right button | Zoom into graphics |
| Shift key + mouse right button | Zoom out from graphics |
| Enlarge key | Reduce overall image |
| Shift key + enlarge key | Magnify overall image |

FIG. 10

| |
|---|
| Zoom into graphics |
| Zoom out from graphics |
| Reduce overall image |
| Magnify overall image |

FIG. 11

| | (a) | (b) | (c) | (d) |
|---|---|---|---|---|
| Outline data | Exclusive selection button | Exclusive selection button with scroller | Exclusive selection button with scroller | "Pre." button & "Next" button |
| Color data | Exclusive selection button | Exclusive selection button | Alternate button | Palette selection button |
| | Slider (RGB each) | Slider (RGB each) | Right/left button (RGB each) | |
| | Palette | Palette | Palette | Palette |
| Size data | Slider (3 directions) | Slider (3 directions) | Right/left button (3 directions) | Right/left button (Magnification ratio) |
| Position data | Difference slider | Difference slider | Difference slider | |
| | Directly move object | Directly move object | | |
| | Slider | Slider | | |
| Graphics zoom | Mouse right button | Mouse right button | Mouse right button | Mouse right button |
| Graphics scroll | Scroller | Scroller | | |
| | Mouse middle button | Mouse middle button | Mouse middle button | Mouse middle button |
| Magnification/reduction of overall image | Enlarge key | Enlarge key | Enlarge key | Enlarge key |
| Selection of object | Mouse left button | Mouse left button | Mouse left button | Mouse left button |

FIG.12

Calender

1995/5

| Sunday | Monday | Tuesday | Wendsday | Thursday | Friday | Saturday |
|---|---|---|---|---|---|---|
| 30 | 1 | 2 Golden week holiday | 3 | 4 | 5 | 6 |
| 7 | 8 Regular meeting | 9 | 10 Idea workshop | 11 | 12 Theme study meeting / New recruit deployment / Welcome party | 13 |
| 14 | 15 Regular meeting | 16 | 17 | 18 Network meeting | 19 | 20 BBQ |
| 21 | 22 Regular meeting | 23 | 24 | 25 | 26 Paid leave | 27 |
| 28 | 29 Regular meeting | 30 Symposium | 31 | 1 | 2 | 3 |

FIG. 13

| | Calendar 801 | | |
|---|---|---|---|
| 4 Thursday<br>Notional holiday<br>6am<br>12am<br>6pm | 5 Friday<br>Children's day<br>6am<br>12am<br>6pm | 6 Saturday<br>6am<br>12am<br>6pm | |
| 11 Thursday<br>6am<br>12am<br>6pm | 12 Friday<br>6am<br>12am ←802<br>6pm | 13 Saturday<br>6am —810a<br>12am —811a<br>6pm —812a<br>Theme study meeting<br>New recruit deployment<br>Welcome perty | |
| 18 Thursday<br>6am<br>12am<br>6pm<br>Network meeting | 19 Friday<br>6am<br>12am<br>6pm | 20 Saturday<br>820a<br>BBQ<br>The Aoyama highlands<br>6am ——Leave at 6a.m.<br>12am ——BBQ<br>6pm ——Come home at 5p.m.<br>820b | |

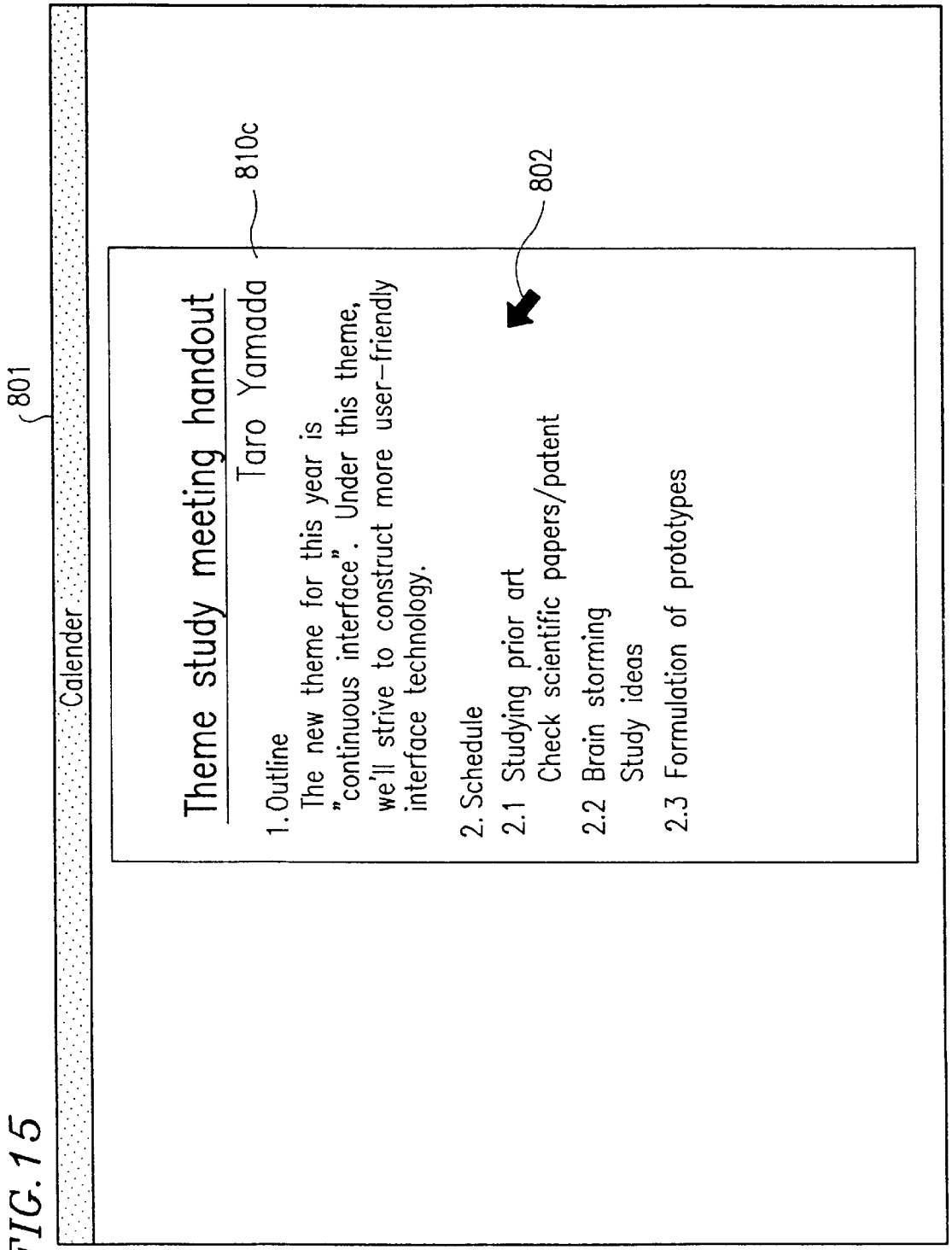

FIG. 16

| | (a) | (b) | (c) | (d) |
|---|---|---|---|---|
| Overall image | Monthly mode | 6-hour mode | 2-hour mode | — |
| Multiple-day schedule object | | | | |
| Item name | Edit | Edit | — | — |
| Duration information | Edit | Edit | — | — |
| Additional information | — | Edit | — | — |
| Daily schedule object | | | | |
| Item name | Edit | Edit | Edit | — |
| Time information | Change date | Change date<br>Change hour | Change date<br>Change hour | — |
| Additional information | — | Edit | Edit | — |
| Associated document | — | — | Display symbol | Launch wordprocessor program |
| Hourly schedule object | | | | |
| Item name | Edit | Edit | Edit | — |
| Time information | Change date | Change date<br>Change hour | Change date<br>Change hour | — |
| Additional information | — | — | Edit | — |
| Associated document | — | — | Display symbol | Launch wordprocessor program |
| Graphics zoom | Mouse right button | Mouse right button | Mouse right button | Mouse right button |
| Graphics scroll | Mouse middle button | Mouse middle button | Mouse middle button | Mouse middle button |
| Magnification/reduction of overall image | Enlarge | Enlarge | Enlarge | Enlarge |
| Selection of object | Mouse left button | Mouse left button | Mouse left button | Mouse left button |

METHOD FOR ENABLING INTERACTIVE MANIPULATION OF DATA RETAINED IN COMPUTER SYSTEM, AND A COMPUTER SYSTEM FOR IMPLEMENTING THE METHOD

BACKGROUND OF THE INVENTION

1. Field of the Invention

The present invention relates to a method for enabling a user to interactively manipulate data retained in a computer system, and a computer system for implementing the method. Moreover, the present invention relates to a multi-window display device.

2. Description of the Related Art

In response to the improvement in the performance of computer systems, a number of graphical user interfaces (hereinafter referred to as "GUIs") have been proposed. Such GUI modes are capable of continuously moving, magnifying/reducing, or zooming in/out from data that is rendered in a two-dimensional or three-dimensional manner, e.g., maps and topographies. Such GUIs make it possible to refer to or edit data including locational information while referring to information concerning the vicinity of the spot of interest, and reduce the burden of perception effort needed by a user.

The following methods are mainly known as methods for interactively manipulating data retained in a computers system, regardless of whether the data is visualized or not:

(1) manipulating domain data by assigning domain data to GUI components, e.g., buttons, sliders, and scrollers, which are operated by a user;

(2) manipulating domain data by allowing a user to directly manipulate graphical objects that visualize domain data; and (3) manipulating graphics by implicitly assigning graphical operations, e.g., moving, magnifying, reducing, etc. to input facilities of an input device so that a user can manipulate the graphics by operating the input device.

Among the above methods, (1) is the most common method which has been used over several years. In this method, the user manipulates the data in a computer system via GUI components. Methods (2) and (3) are used for graphically displaying data including locational information (e.g., a map) or visualizing data in some way.

However, according to the prior art for processing visualized graphics that are present in the same field as GUI components, the visualized graphics and the GUI components are usually treated as separate components even if they are dedicated to the same domain data. That is, the GUI components under the prior art are treated merely as a control panel for manipulating domain data or visualized graphics. Therefore, the GUI components are not magnified/reduced in response to continuous movement or magnification/reduction of the visual graphics under the prior art. At best, GUI components that are mingled with visualized graphics are either left in the same size or totally eliminated under the prior art.

In the case where there are too many GUI components to be displayed simultaneously, the prior art utilizes alternatives such as "menus" or the like in order to selectively display classified groups of GUI components. However, this technique reduces the operational efficiency because the user is often required to move the cursor to reselect a GUI component classified in another group. Especially if not well acquainted with the classification system of GUI components, the user may take a long time to display the desired GUI component.

Some prior art GUI techniques allow GUI components to change their sizes in accordance with predetermined magnification/reduction ratios. However, reducing the displayed size of a GUI component hinders the operation facility of the GUI component in some extreme cases. For example, if a slider is excessively reduced in size, it becomes very difficult to control the slider by using a mouse or the like.

On the other hand, a user may magnify or zoom into graphics when it is necessary to refer to or edit the more detailed data, and may reduce or zoom out from graphics when referring to or editing the more general data.

Moreover, when a user wishes to magnify a partial region of a given window using a conventional multi-window display device, the user is required to first activate a menu item such as "Move displayed region" to move the center of the displayed image to a desired position before activating a menu item such as "Magnification/Reduction" to change the magnification ratio, and so on. Therefore, even if a user simply wishes to generate a new window including a designated region within a displayed image, there is great difficulty in doing so.

A conventional device is known which allows a user to first designate a region to be magnified and then open a new window which includes the designated region, but this system still requires the user to select various menu items in order to open the new window, thereby increasing the operation complexity. Specifically, the user is required to use a mouse or the like to move an arrow in a display region 405a (FIG. 23) to a menu region (which is often located above the display region 405a) and locate the arrow A on a desired portion of a menu to select an item or icon, for example. This procedure requires the eyes of the user to temporarily avert from the displayed content, resulting in an interruption in the user's thought. Such an interruption in thought prevents smooth flow thereof because it requires the user's attention to be directed back and forth between different regions on the display.

SUMMARY OF THE INVENTION

A method for enabling a user to interactively manipulate data retained in a computer system according to the present invention includes the steps of: comparing a variable value with a predetermined threshold value, the variable value varying in accordance with a predetermined instruction which is input to the computer system; selecting one of a plurality of interaction tools in accordance with the result of comparison of the variable value with the predetermined threshold value, each of the plurality of interaction tools providing a different method for manipulating the same data; and displaying the selected one of the plurality of interaction tools.

In one embodiment of the invention, the step of displaying the selected one of the plurality of interaction tools includes changing, in accordance with the predetermined instruction, a displayed image of the selected one of the plurality of interaction tools.

A computer system according to the present invention includes: input means for inputting a predetermined instruction; a comparator for comparing a variable value with a predetermined threshold value, the variable value varying in accordance with a predetermined instruction which is input via the input means; a selector for selecting one of a plurality of interaction tools in accordance with the result of comparison of the variable value with the predetermined threshold value, each of the plurality of interaction tools providing a different method for manipulating the same data; and a display for displaying the selected one of the plurality of interaction tools.

In one embodiment of the invention, the display changes, in accordance with the predetermined instruction input via the input means, a displayed image of the selected one of the plurality of interaction tools.

In another embodiment of the invention, the predetermined instruction input via the input means is an instruction for magnifying or reducing an overall image, and the variable value is a zoom ratio of the overall image.

In still another embodiment of the invention, the interaction tool includes at least one of: a GUI component for enabling the user to manipulate data; means for enabling the user to directly manipulate a graphical object which is a visual representation of data; and means for providing a graphical operation implicitly assigned to input facilities of the input means;

In still another embodiment of the invention, the interaction tool includes an object having data and a method for manipulating the data.

A multi-window display device according to the present invention includes: a display section including a display region including a window region for displaying display data; a pointer for designating coordinates in the display region to define a further window region; and a control section for controlling the display section so as to multiply a portion of the display data corresponding to the further window region by a predetermined ratio and display the portion of the display data as multiplied by the predetermined ratio.

In one embodiment of the invention, the predetermined ratio is 1.

In another embodiment of the invention, the portion of the display data corresponding to the further window region defined by the coordinates in the display region constitutes a part of the display data.

In still another embodiment of the invention, the portion of the display data corresponding to the further window region defined by the coordinates in the display region constitutes the entire display data.

In still another embodiment of the invention, the predetermined ratio is a ratio possessed by a window present in the further window region defined by the coordinates in the display region.

Alternatively, a multi-window display device according to the present invention includes: a first storage section for storing display data having coordinates; a second storage section for storing position and size of a window and the coordinates of the display data; a position designation section for designating coordinates of a position in a display region; a region designation section for obtaining a further window region based on the coordinates of the position designated by the position designation section; a window generation section for selecting data corresponding to the window region from within the first storage section based on the position and size of the window and the coordinates of the display data stored in the second storage section so as to generate a window; a coordinate transform section for performing a coordinate transform for converting the coordinates of the display data stored in the first storage section into coordinates of the window generated by the window generation section; and a display section for displaying display content of the window after the coordinate transform by the coordinate transform section.

Thus, according to the present invention, data to be referred to or edited (or data which is capable of being referred to or edited) can be adapted in response to the magnification/reduction of the graphics. With respect to one piece of data alone, the operable range of data to be manipulated by a user can be adapted in response to the magnification/reduction of the graphics of the overall graphic image according to the present invention.

Thus, the invention described herein makes possible the advantages of: (1) providing a universal interaction tool set in a zoomable GUI environment; and (2) providing a multi-window display device and a multi-window controlling method for opening a new window corresponding to a designated region in a desired position, the opening of such a new window being simple and smooth.

These and other advantages of the present invention will become apparent to those skilled in the art upon reading and understanding the following detailed description with reference to the accompanying figures.

BRIEF DESCRIPTION OF THE DRAWINGS

FIG. 9 shows an exemplary structure of an instruction interpretation table stored in an instruction interpretation table storage area 403c of a storage device 403.

FIG. 10 shows an exemplary structure of an interaction instruction table stored in an interaction instruction table storage area 403d of the storage device 403.

FIG. 11 shows an exemplary structure of an interaction conversion table stored in an interaction conversion table storage area 403g of the storage device 403.

FIG. 12 illustrates one transitional state of an overall image 801 of a calendar application to which the method of the present invention is applied.

FIG. 13 illustrates one transitional state of an overall image 801 of a calendar application to which the method of the present invention is applied.

FIG. 15 illustrates one transitional state of an overall image 801 of a calendar application to which the method of the present invention is applied.

FIG. 16 shows the structure of an exemplary interaction conversion table stored in an interaction conversion table storage area 403g of the storage device 403.

FIG. 23 illustrates an exemplary displayed image, from which an operation for designating a region to become a new window with the use of the mouse 406b in FIG. 20 is begun.

FIG. 24 illustrates an exemplary displayed image, at which an operation for designating a region to become a new window with the mouse 406b is finished.

FIG. 25 illustrates an exemplary displayed image, in which a new window 81 has opened in a designated area as a region designation process is finished.

FIG. 26 illustrates an exemplary displayed image in which the new window in FIG. 25 has been moved.

FIG. 27 illustrates an exemplary displayed image in which the new window in FIG. 25 has been changed in size.

FIG. 28 illustrates an exemplary displayed image in which the display content of the new window in FIG. 25 has been subjected to a change in magnification ratio (resulting in a magnification).

DESCRIPTION OF THE EMBODIMENTS

Hereinafter, the present invention will be described by way of examples, with reference to the accompanying figures.

Figure 1:
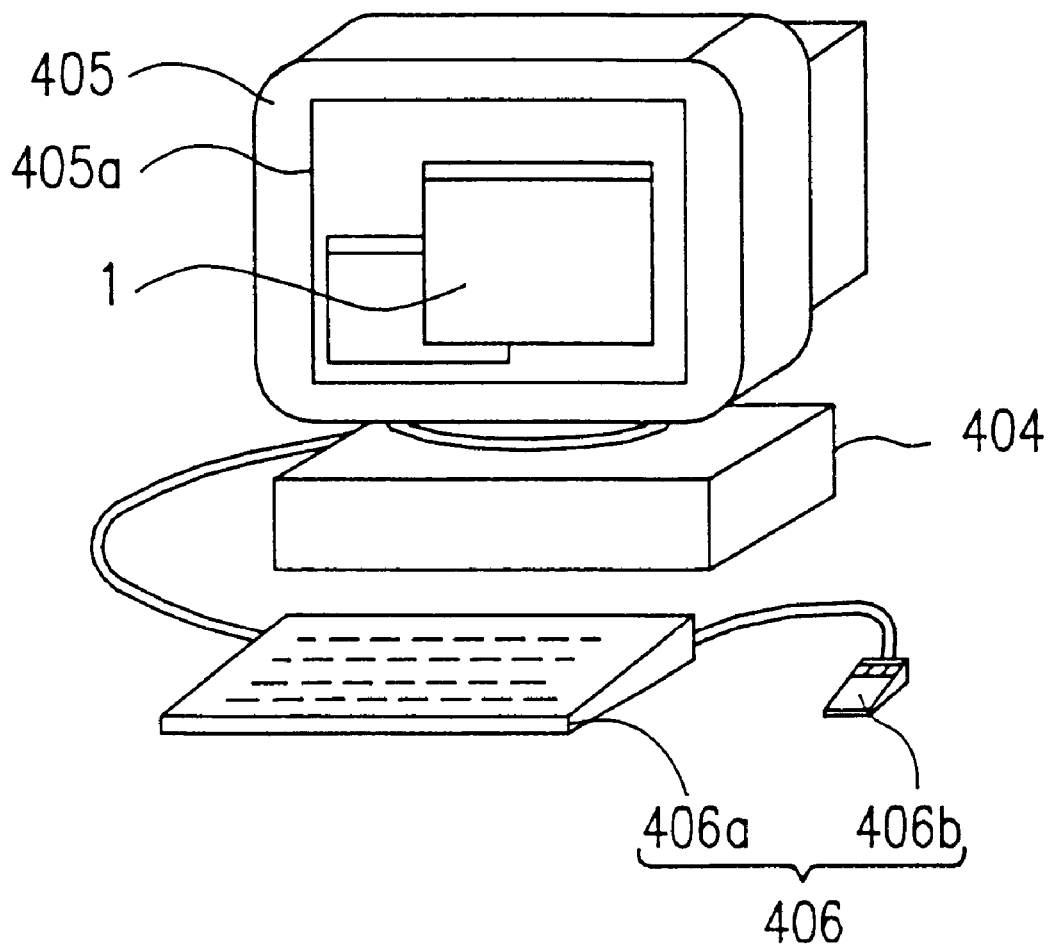
FIG. 1 is a schematic view illustrating a computer system suitable for implementing a method of the present invention for enabling a user to interactively manipulate data.

FIG. 1 schematically shows a computer system implementing a method of the present invention for enabling a user to manipulate data in an interactive manner. The computer system includes a housing 404, a display device 405, and an input device 406. The housing 404 accommodates a CPU (not shown), a graphics processor (not shown), and a storage device (not shown). The storage device and the input device are coupled to the CPU. The display device is coupled to the CPU via the graphics processor.

The input device 406 typically includes a keyboard 406a and a mouse 406b for enabling a user to input data into the computer system. The input device 406 may alternatively include a joystick, a three-dimensional mouse, etc. Data input via the input device 406 is supplied to the CPU in the housing 404.

The display device 405 displays data which has been input to the CPU and data which has been processed by the CPU. The display device 405 can be a CRT (Cathode Ray Tube) display, a LCD (Liquid Crystal Display), or the like. The computer system preferably incorporates a multi-window system capable of displaying a plurality of windows in a display region 405a of the display device 405 so that a large amount of data can be simultaneously displayed.

EXAMPLE 1

The outline of the method of the invention for enabling a user to manipulate data in an interactive manner will be described with reference to FIGS. 2 to 5. The present example illustrates a case where the method of the invention is applied to a drawing software program (i.e., a program for drawing graphics in accordance with instructions given by a user). However, the method of the present invention is not limited to any particular kind of software program.

Figure 2:
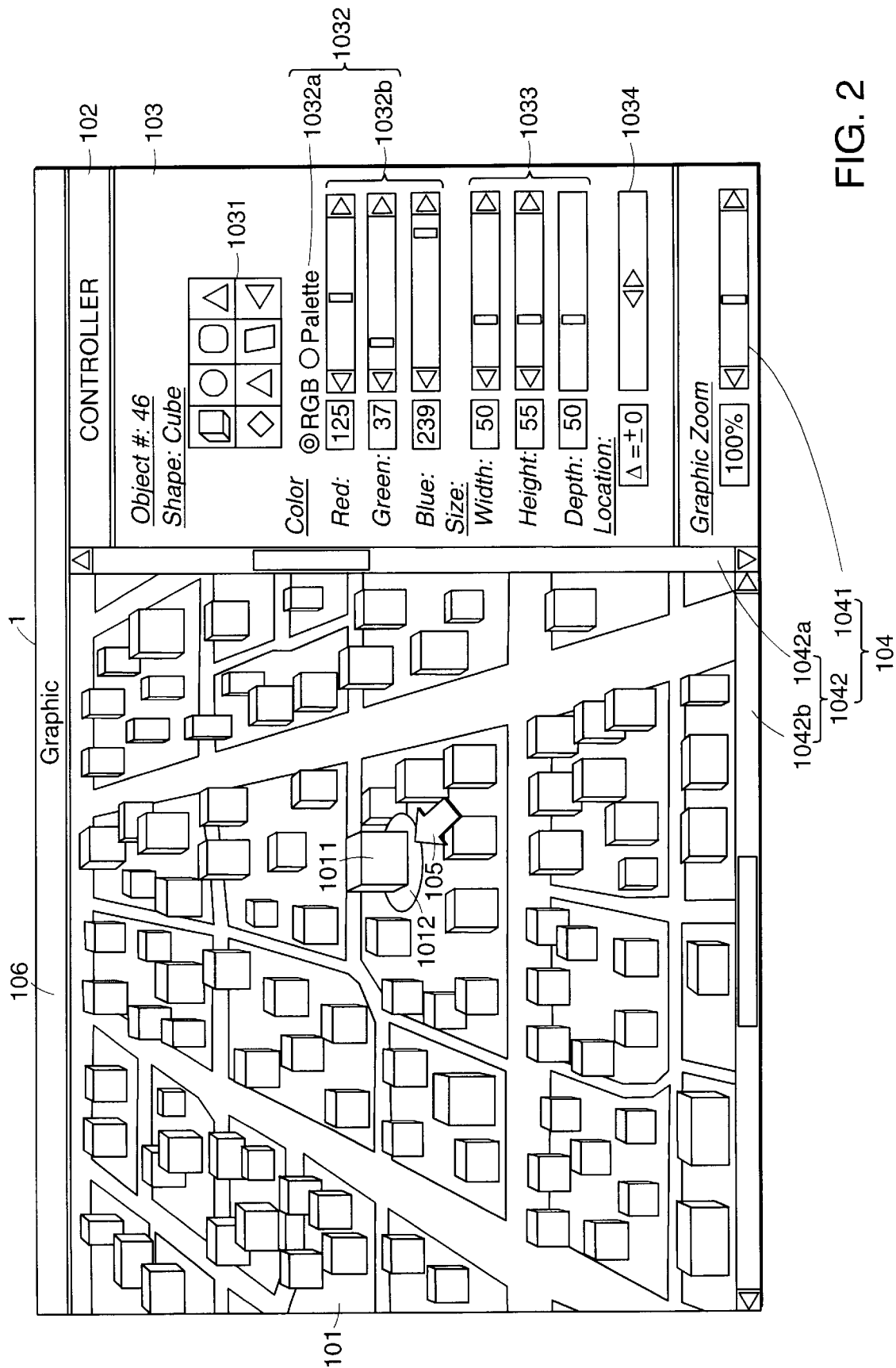
FIG. 2 illustrates one transitional state of an overall image 1 of a drawing program to which the method of the present invention is applied.

FIG. 2 is a magnified view showing an overall image 1 of the drawing program as displayed in a window in the display region 405a shown in FIG. 1.

The overall image 1 includes a graphics display section 101, a controller section 102, and a title bar 106.

The graphics display section 101 displays graphical objects. Herein, a "graphical object" is defined as a visual representation of all or part of domain data stored in a domain data storage area 403a of the storage device 403 (shown in FIG. 6). In the present example, domain data includes outline data (which defines the outline of the object), color data which defines the color of the object), size data (which defines the size of the object), and position data (which defines the position of the object). A graphical object having an outline, color, size, and position corresponding to the respective outline, color, size, and position data included in the domain data is displayed by the graphics display section 101. In other words, each graphical object in the present example can be considered as an object (defined by the outline, color, size, and position data included in the domain data) being mapped onto the graphics display section 101. In the present example, the graphical objects are displayed as cubic shapes.

The graphics display section 101 also displays a cursor 105. The cursor 105 is used for selecting one of a plurality of graphical objects displayed by the graphics display section 101. The position of the cursor 105 can be moved by a user operating the mouse 406b, for example. Once a graphical object is selected by means of the cursor 105, a selection indicator 1012 is displayed, which denotes the selected graphical object. However, the selection indicator 1012 is erased from the graphics display section 101 if the user does not select any graphical objects or if the selection is cancelled.

The controller section 102 includes an object controller 103 for manipulating the attributes of a graphical object selected by the user and a graphics controller 104 for controlling the graphics displayed by the graphics display section 101.

The object controller 103 includes an outline selection portion 1031 for selecting the outline of an object in an exclusive manner, a color setting portion 1032 used for setting the color of the object, a size setting portion 1033 for setting the size of the object, and an object movement portion 1034 for moving the position of the object by a designated difference.

The outline selection portion 1031 includes exclusive selection buttons for selecting the outline of an object in an exclusive manner. As used herein, "exclusive selection buttons" function in such a manner that activating one of the plurality of such buttons would result in the deactivation of all the other buttons. In other words, the outline selection portion 1031 adopts the exclusive selection buttons as GUI components for providing a method for a user to manipulate outline data in an interactive manner.

The color setting portion 1032 includes a color setting selection button 1032a for choosing whether to set the color of the object in a RGB method or a palette method. As used herein, the "RGB method" is a method for designating a color in terms of mixing ratio between R (red), G (green), and B (blue), and the "palette method" is a method for designating a color which is selected among a plurality of colors provided in a palette. The color setting portion 1032 also includes a color selection portion 1032b for actually selecting a color according to the color setting method selected by means of the color setting selection button 1032a. In the exemplary case shown in FIG. 2, the RGB method is selected by means of the color setting selection button 1032a, so that three sliders (i.e., one for setting the R value, one for setting the G value, and one for setting the B value) are displayed as the color selection portion 1032b. In other words, the color setting portion 1032 adopts the three sliders (R, G, and B) as GUI components for providing a method for a user to manipulate color data in an interactive manner. In the case where the palette method is selected by means of the color setting selection button 1032a, a palette for designating one of a plurality of previously provided colors is displayed as the color selection portion 1032b.

The size setting portion 1033 includes three sliders, i.e., one for setting the width of an object, one for setting the height of the object, and one for setting the depth of the object. In other words, the size setting portion 1033 adopts the three sliders (width, height, and depth) as GUI components for providing a method for a user to manipulate size data in an interactive manner. In the case where the object has only one dimension or two dimensions, the slider for setting the depth of the object is unnecessary.

The object movement portion 1034 includes a difference slider for moving the position of the object by a designated difference. In other words, the object movement portion 1034 adopts the difference slider as a GUI component for providing a method for a user to manipulate position data in an interactive manner.

The graphics controller 104 includes a graphics zoom slider 1041 for zooming into and out from the graphics displayed by the graphics display section 101 and a graphics scroller 1042 for scrolling the graphics along the vertical direction and/or horizontal direction. The graphics scroller 1042 includes a vertical scroller 1042a for controlling vertical scrolling and a horizontal scroller 1042b for controlling horizontal scrolling.

Next, as an illustration of one aspect of the present invention, the manner in which the various GUI components of the controller section 102 change in accordance with a "Reduce the overall image" instruction input via the input device 406, which gradually decreases the zoom ratio, will be described.

Herein, it is assumed that the zoom ratio decreases by 1% every time a "Reduce the overall image" instruction is input via the input device 406. However the decrement value of the zoom ratio is not limited to 1%, but can be any value which is sufficiently small for the overall image 1 to smoothly reduce in size. In the present example, the "zoom ratio" is defined as [(length of one side of the overall image 1)/(reference length)]×100, where the reference length is defined as the length of the one side of the overall image 1 when maximized.

FIG. 2 shows the graphics display section 101 and the controller section 102 under a zoom ratio of 100%. When the zoom ratio reaches 80% by a continuous application of "Reduce the overall image" instructions via the input device 406, all or some of the GUI components of the controller section 102 under a zoom ratio of 100% are automatically replaced by other GUI components.

Figure 3:
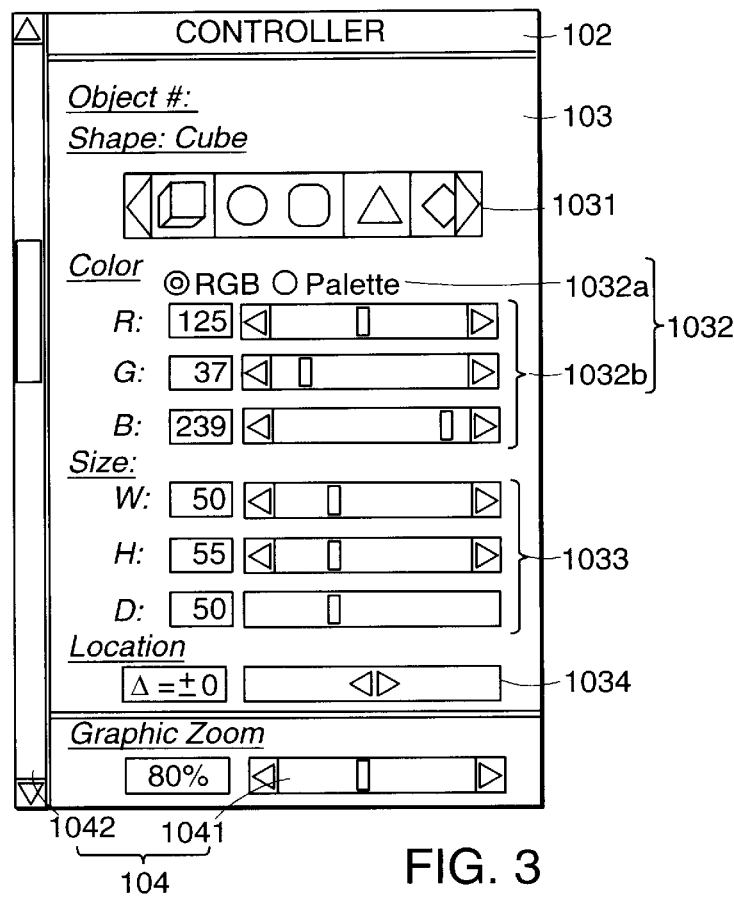
FIG. 3 illustrates one transitional state of the overall image 1 of a drawing program to which the method of the present invention is applied.

FIG. 3 shows the controller section 102 under a zoom ratio of 80%. (The graphics display section 101 is omitted in FIG. 3 because it is not essential to the illustration of the present example.) In the exemplary case shown in FIG. 3, the exclusive selection buttons for selecting the outline of an object in an exclusive manner have automatically been replaced by exclusive selection buttons with a scroller in order to effectively utilize the area of the controller section 102, which has been reduced in accordance with the 80% reduction of the overall image 1.

When the zoom ratio reaches 60% by a continuous application of "Reduce the overall image" instructions via the input device 406, all or some of the GUI components of the controller section 102 under a zoom ratio of 80% are automatically replaced by other GUI components.

Figure 4:
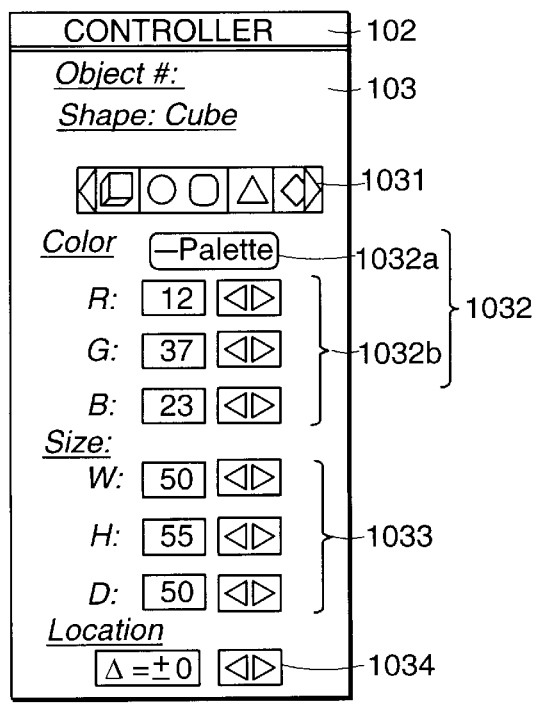
FIG. 4 illustrates one transitional state of the overall image 1 of a drawing program to which the method of the present invention is applied.

FIG. 4 shows the controller section 102 under a zoom ratio of 60%. (The graphics display section 101 is omitted in FIG. 4 because it is not essential to the illustration of the present example.) In the exemplary case shown in FIG. 4, the exclusive selection buttons for selecting the method of setting the color of an object have automatically been replaced by an alternate button. Moreover, the three sliders for setting the R, G, and B values of the object color have each been automatically replaced by a right/left button. Similarly, the three sliders for setting the size of the object have each been automatically replaced by a right/left button. Furthermore, the slider for changing the zoom ratio of the graphics is omitted. Similarly, the scroller 1042 for scrolling the graphics is omitted. These changes are all made in order to more effectively utilize the area of the controller section 102, which has reduced in accordance with the 60% reduction of the overall image 1.

When the zoom ratio reaches 40% by a continuous application of "Reduce the overall image" instructions via the input device 406, all or some of the GUI components of the controller section 102 under a zoom ratio of 60% are automatically replaced by other GUI components.

Figure 5:
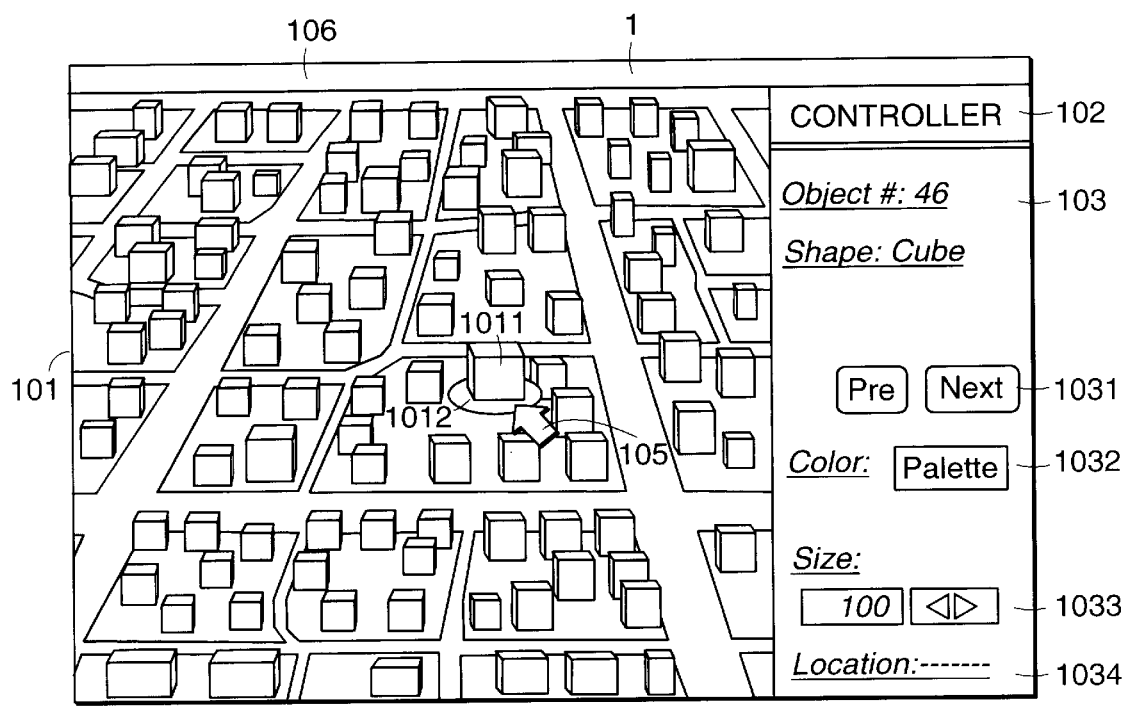
FIG. 5 illustrates one transitional state of an overall image 1 of a drawing program to which the method of the present invention is applied.

FIG. 5 shows the graphics display section 101 and the controller section 102 under a zoom ratio of 40%. In the exemplary case shown in FIG. 5, the exclusive selection buttons with a scroller for selecting the outline of an object in an exclusive manner have automatically been replaced by a "Pre" button and a "Next" button. The "Pre" button is used for selecting a previous outline of the currently selected object, and the "Next" button is used for selecting a next outline of the currently selected object. Moreover, the alternate button for selecting the method of setting the color of the object has automatically been replaced by a palette selection button. Any right/left buttons for setting the R, G, and B values of the object color are not displayed. Furthermore, the three right/left buttons for setting the size of the object have automatically been replaced by one right/left button. The difference slider for moving the position of the object by a designated difference is not displayed. These changes are made in order to effectively utilize the area of the controller section 102, which has reduced in accordance with the 40% reduction of the overall image 1.

Thus, all or some of the GUI components of the controller section 102 are automatically replaced by other GUI components or omitted from display as the zoom ratio reaches 80%, 60%, or 40%. It will be appreciated that the user cannot operate the GUI components which are omitted from display.

The GUI components which are displayed in the controller section 102 under a zoom ratio smaller than 100% and larger than 80% are identical with those displayed in the controller section 102 under a zoom ratio of 100%. However, the sizes of the GUI components which are displayed in the controller section 102 under a zoom ratio between 100% and 80% are linear-complemented based on the sizes of the respective GUI components under a zoom ratio of 100% and the sizes of the respective GUI components under a zoom ratio of 80% in order to ensure that their sizes smoothly change as the zoom ratio reduces. For example, assuming that a GUI component has a size of 50 mm×50 mm under a zoom ratio of 100% and a size of 40 mm×40 mm under a zoom ratio of 80%, a linear complement can be attained by reducing the size of this GUI component by 0.5 mm×0.5 mm each time a "Reduce the overall image" instruction is input via the input device 406. However, any complement method other than the linear complement method can be employed as long as it ensures that the sizes of the GUI components in the controller section 102 smoothly reduce with the reduction in the zoom ratio.

Similarly, the GUI components which are displayed in the controller section 102 under a zoom ratio smaller than 80% and larger than 60% are identical with those displayed in the controller section 102 under a zoom ratio of 80%. The GUI components which are displayed in the controller section 102 under a zoom ratio smaller than 60% and larger than 40% are identical with those displayed in the controller section 102 under a zoom ratio of 60%. The GUI components which are displayed in the controller section 102 under a zoom ratio smaller than 40% are identical with those displayed in the controller section 102 under a zoom ratio of 40%. However, the sizes of the GUI components in the controller section 102 under a zoom ratio in any of the above-mentioned ranges (e.g., 70%, 50%, or 30%) are complemented so as to smoothly reduce as the zoom ratio reduces.

In the present example, all or some of the GUI components of the controller section 102 are automatically replaced by other GUI components or omitted from display as the zoom ratio reaches 80%, 60%, or 40%. However, the particular zoom ratios at which the above-mentioned changes in the GUI components of the controller section 102 occur are not limited to these values, but can be arbitrarily selected.

Although the present example illustrates the changes in various GUI components in the controller section 102 in the case where the zoom ratio is gradually decreased from 100%, it is also possible to appropriately change the GUI components in the controller section 102 as the zoom ratio is gradually increased from 40%, for example.

Thus, according to the present invention, the GUI components in the controller section 102 are "smoothly" changed as the zoom ratio increases or decreases. Thus, the present invention provides a universal interaction tool set in a zoomable GUI environment.

Figure 6:
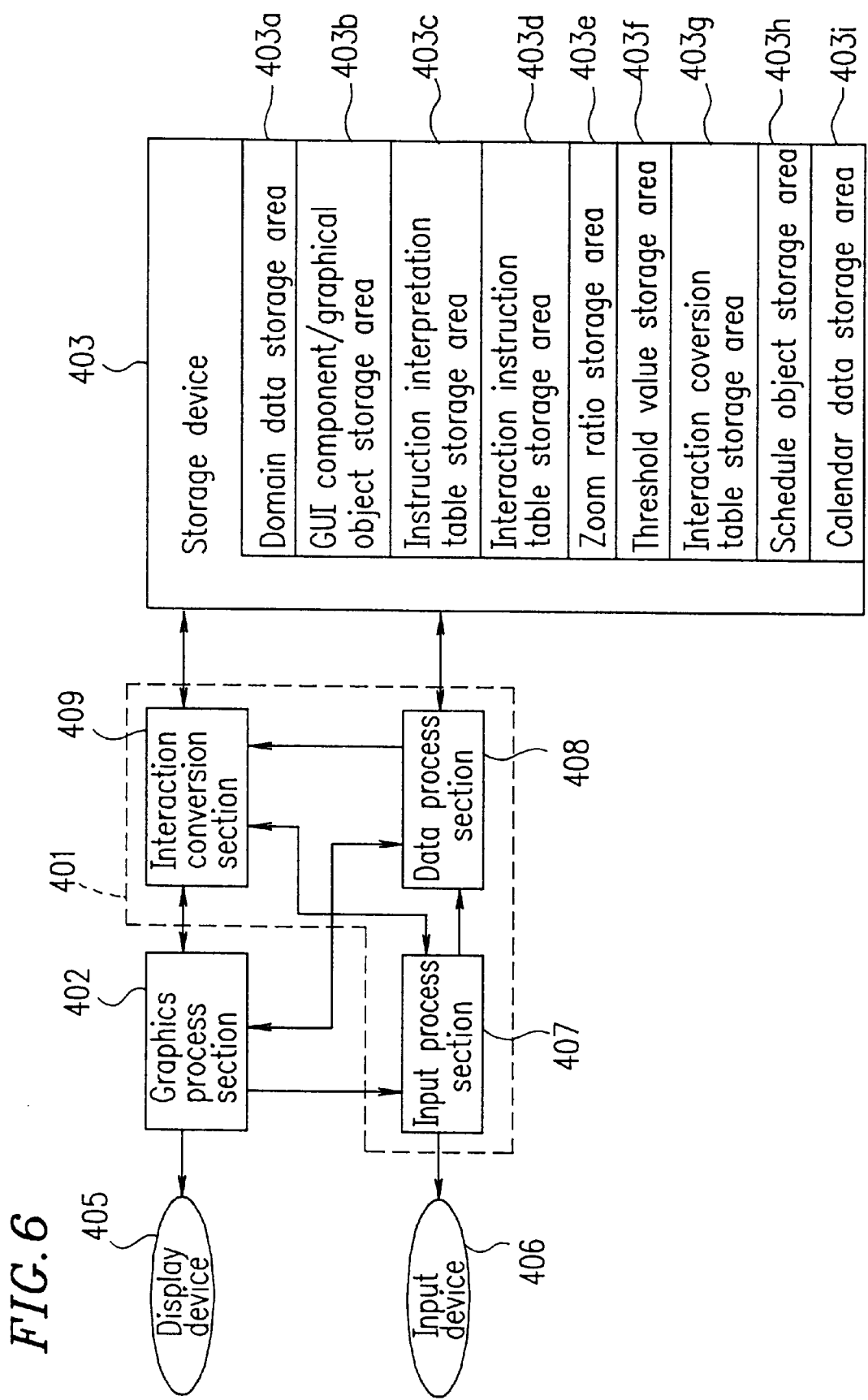
FIG. 6 is a block diagram illustrating a computer system implementing a method of the present invention for enabling a user to interactively manipulate data.

FIG. 6 shows a detailed configuration of the computer system implementing a method of the present invention for enabling a user to manipulate data in an interactive manner.

A CPU 401 is composed essentially of a microprocessor. In the present example, the functions of the CPU 401 can be classified into three categories: input process, data process, and interaction conversion. Therefore, in the following description, the CPU 401 will be illustrated as having an input process section 407, a data process section 408, and an interaction conversion section 409.

A graphics process section 402 generates graphics to be displayed by the display device 405 based on information supplied by the CPU 401.

The storage device 403 includes a RAM (Random Access Memory) and has a program defining the operation procedure of the CPU 401 and data to be processed by the CPU 401 stored therein. The data stored in the storage device 403 is read by the CPU 401. Specifically, the storage device 403 includes areas 403a to 403i for storing various data and tables. For example, a GUI component/graphical object storage area 403b stores information concerning the states and methods of operating various GUI components and graphical objects.

Figure 7:
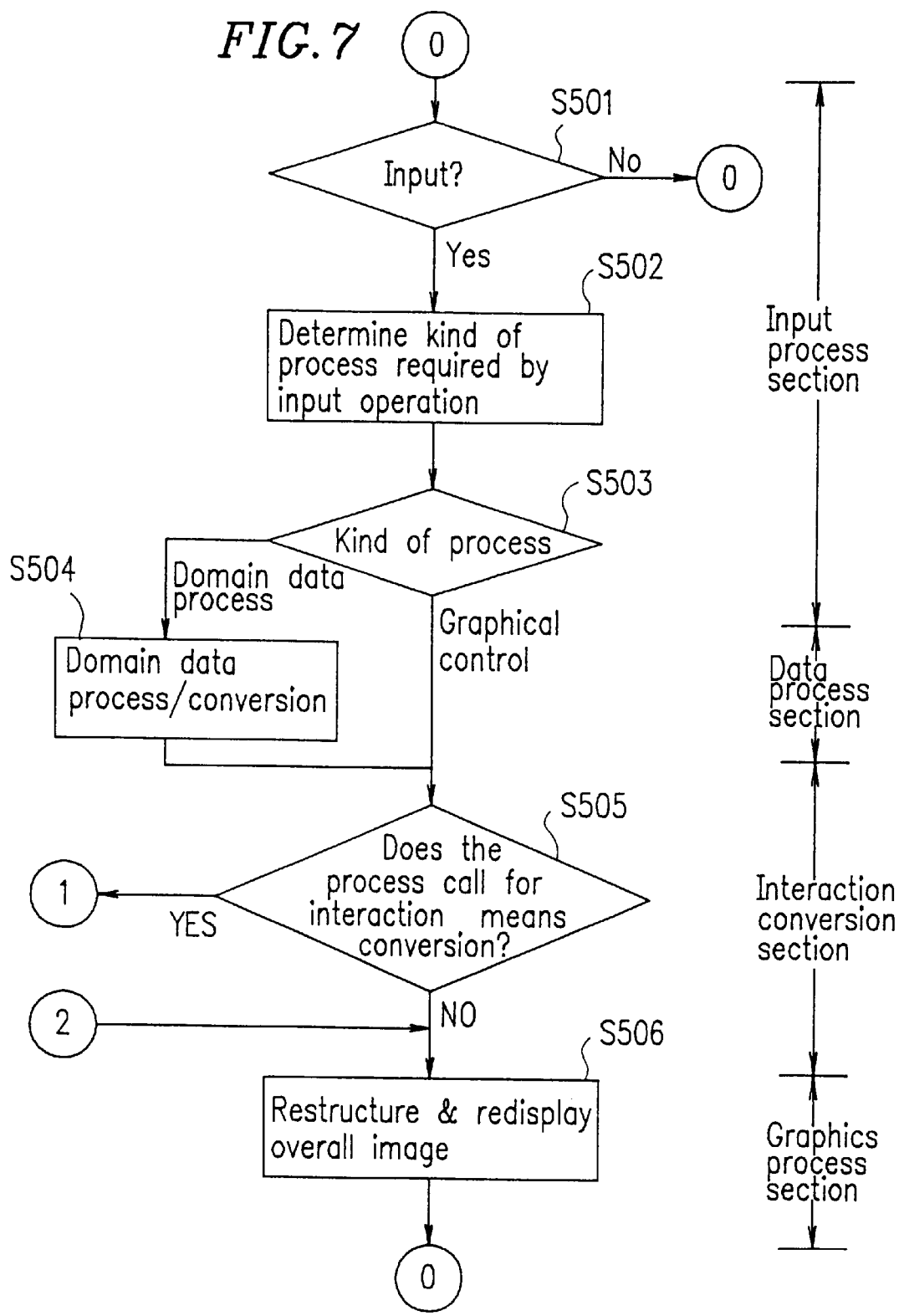
FIG. 7 is a flowchart illustrating a method of the present invention for enabling a user to interactively manipulate data.
Figure 8:
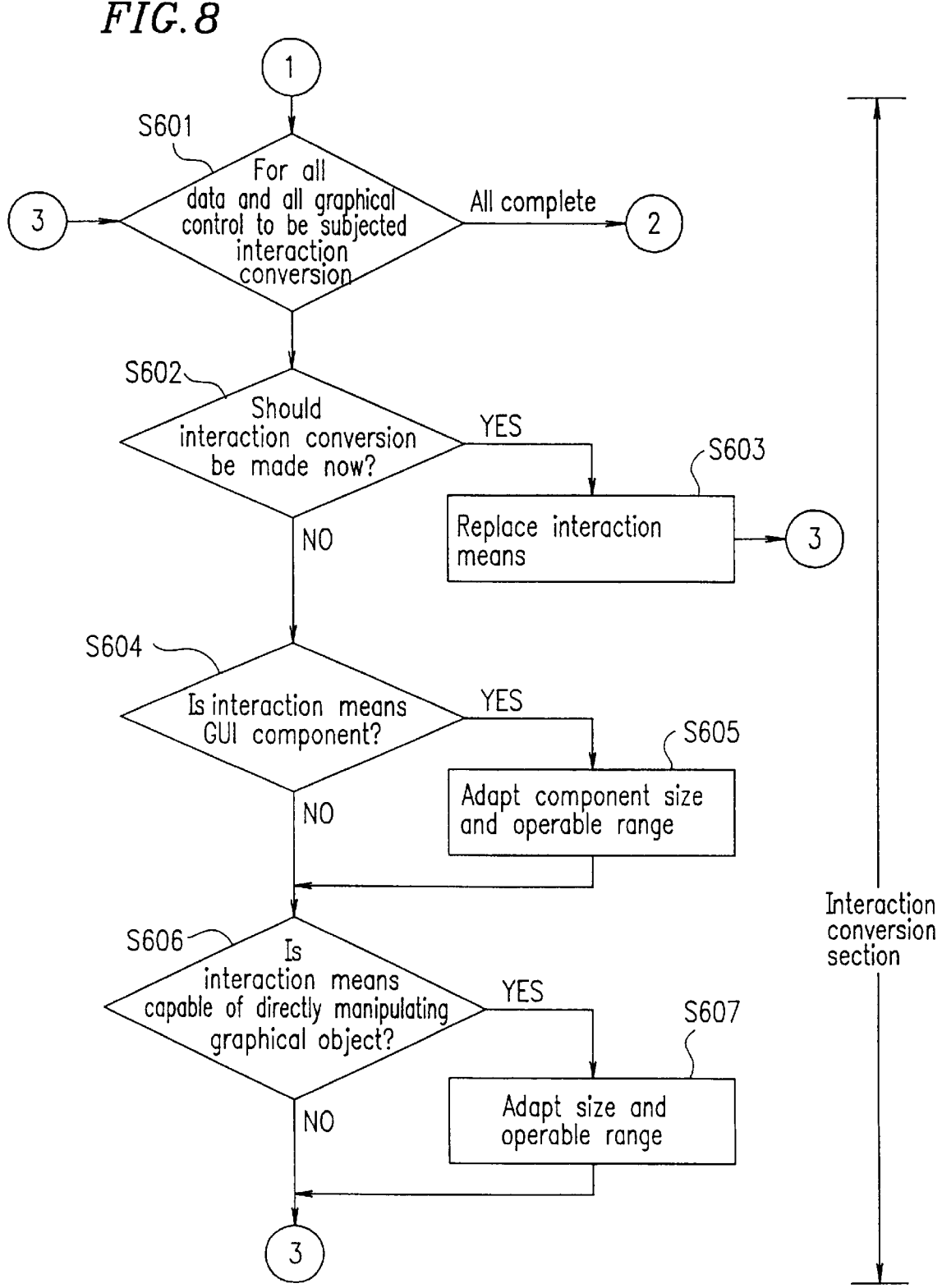
FIG. 8 is a flowchart illustrating a method of the present invention for enabling a user to interactively manipulate data.

FIGS. 7 and 8 show portions of a flowchart illustrating the procedure of the method of the present invention for enabling a user to manipulate data in an interactive manner. Hereinafter, the processes performed at various sections of the computer system shown in FIG. 6 will be described in detail.

At step S501, the input process section 407 determines whether or not an instruction has been input by a user by means of the input device 406. If an instruction has been input by the user, the process proceeds to step S502. If no instruction has been input by the user, step S501 is repeated.

At step S502, the input process section 407 interprets the meaning of the instruction made by the user. For example, if the user has pressed a left button of the mouse 406b at coordinates (x, y) in a certain window, the input process section 407 receives a signal indicating that "the left button of the mouse has been pressed at coordinates (x, y) in the window" from the input device 406. This signal may be interpreted to indicate the selection of an outline of an object (when the coordinates (x, y) correspond to an exclusive selection button), or the selection of a vertical scroll (when the coordinates (x, y) correspond to the scroller 1042a), for example. Such an interpretation of the instruction by the user is uniquely determined by referring to the information available at the graphics process section 402, which grasps the locations of every element in a given window displayed by the display device 405 (because any information to be displayed on the display device 405 is processed by or passes through the graphics process section 402).

If the user's instruction corresponds to an instruction that is implicitly assigned to a certain graphical operation (described below), the input process section 407 interprets the meaning of the instruction by referring to an instruction interpretation table describing the correspondence between users' instructions and graphical operations implicitly assigned to the respective instructions. Such an instruction interpretation table is previously stored in an instruction interpretation table storage area 403c of the storage device 403.

FIG. 9 shows the structure of an exemplary instruction interpretation table stored in the instruction interpretation table storage area 403c of the storage device 403. For example, the 6th line of this exemplary instruction interpretation table indicates that an input operation of "pressing an ENLARGE key" is implicitly assigned to a graphical operation of "reducing the overall image". Accordingly, when a signal indicating that "the ENLARGE key has been pressed" is input from the input device 406 to the input process section 407, the input process section 407 interprets the signal as instructing to "reduce the overall image". Herein, the ENLARGE key can be any key arbitrarily selected on the keyboard 406a. Alternatively, it is possible to use an input device functioning as the ENLARGE key in addition to or in place of the keyboard 406a. The result of interpretation by the input process section 407 is supplied to the interaction conversion section 409.

At step S503, the input process section 407 determines whether the user's instruction pertains to processing domain data or to graphical control. If the user's instruction concerns the processing of domain data, the input process section 407 sends the instruction to the data process section 408 and the process proceeds to step S504 and further to step S505. If the user's instruction concerns graphical control, the process proceeds to step S505. At step S504, the data processes the instruction sent from the input process section 407. For example, if the instruction sent from the input process section 407 instructs that an outline of the object be selected (using an exclusive selection button), the data process section 408 rewrites the corresponding outline data among the domain data stored in the domain data storage area 403a of the storage device 403. The processing result of the data process section 408 is sent to the graphics process section 402.

At step S505, the interaction conversion section 409 determines whether or not the user's instruction would cause an interaction conversion (described below). If the determination is "Yes", the process proceeds to an interaction conversion process shown in FIG. 8. If the determination is "No", the process proceeds to step S506.

Herein, an "interaction conversion" is defined as the replacement of a certain interaction tool (e.g., a GUI component) with another interaction tool. However, an "interaction conversion" as broadly interpreted also encompasses any change in the size and/or the operable range of such an interaction tool. In this respect, the interaction conversion process shown in FIG. 8 is an illustration of a broadly interpreted "interaction conversion".

For the determination at step S505, the user's instruction after being interpreted at step S502 is previously provided to the interaction conversion section 409 from the input process section 407. Instructions which would cause an interaction conversion (hereinafter referred to as "interaction-causing instructions") are previously stored in the interaction instruction table storage area 403d of the storage device 403. Accordingly, the interaction conversion section 409 determines whether or not the user's instruction causes an interaction conversion by comparing the user's instruction against the instructions previously stored in the interaction instruction table storage area 403d of the storage device 403.

FIG. 10 shows an exemplary structure of an interaction instruction table previously stored in the interaction instruction table storage area 403d of the storage device 403. The interaction instruction table defines the four instructions, i.e., "Zoom into the graphics", "Zoom out from the graphics", "Reduce the overall image" and "Magnify the overall image", as interaction-causing instructions. It will be appreciated that the interaction-causing instructions are not limited to only those described in FIG. 10.

At step S506, the graphics process section 402 reconstructs the overall image in accordance with the user's instruction and redisplays the reconstructed overall image on the display device 405.

Hereinafter, the interaction conversion process performed by the interaction conversion section 409 will be described assuming that the user has given a "Reduce the overall image" instruction. A continuous reduction of the overall image can be realized by continuously pressing the ENLARGE key, for example. Herein, "continuous" defines a state in which a key such as the ENLARGE key is kept down by a user. While the ENLARGE key is on, the overall image is continuously reduced by a small predetermined reduction interval.

The interaction conversion process is performed for all data and all graphical control to be subjected to interaction conversion (step S601).

At step S602, the interaction conversion section 409 determines whether or not an interaction conversion should be made, by comparing the current zoom ratio with a predetermined threshold value(s). The current zoom ratio is stored in the zoom ratio storage area 403e of the storage device 403 and is updated by the input process section 407 in response to every depression of the ENLARGE key. For example, the current zoom ratio is reduced by the predetermined reduction interval, e.g., 1% in response to every depression of the ENLARGE key of the keyboard 406a. One or more predetermined threshold values are previously stored in the threshold value storage area 403f of the storage device 403.

In the description below, it is assumed that "80%", "60%", and "40%" are previously stored in the threshold value storage area 403f of the storage device 403. Thus, the interaction conversion section 409 determines that an interaction conversion should be made when the current zoom ratio equals the first threshold value (80%), the second threshold value (60%), or the third threshold value (40%). It will be appreciated that the threshold values are not limited to these values. If it is determined that an interaction conversion should be made, the process proceeds to step S603.

At step S603, the interaction conversion section 409 converts those interaction tools (used for the manipulation of data) which are subject to an interaction conversion into other interaction tools, and converts those interaction tools (used for graphical control) which are subject to an interaction conversion into other interaction tools, by referring to the interaction conversion table. The interaction conversion table is previously stored in the interaction conversion table storage area 403g of the storage device 403.

In the present specification, an "interaction tool" is defined as: 1) a GUI component which enables a user to manipulate data, e.g., a button, a slider, or a scroller; 2) means for enabling a user to directly control a graphical object which is a visual representation of data; or 3) means for enabling an implicitly-assigned graphical operation which does not take any shape on the display.

FIG. 11 shows an exemplary structure of the interaction conversion table stored in the interaction conversion table storage area 403g of the storage device 403. The interaction conversion table specifically defines what type of interaction tool should replace another interaction tool at a given threshold zoom ratio. First, a case will be considered where the zoom ratio is gradually decreased from 100% by inputting a "Reduce the overall image" instruction via the input device 406. In this exemplary case, an interaction tool shown in column (a) of FIG. 11 is to be replaced by another interaction tool shown in column (b) when the zoom ratio equals the first threshold value (80%). Similarly, an interaction tool shown in column (b) of FIG. 11 is to be replaced by another interaction tool shown in column (c) when the zoom ratio equals the second threshold value (60%).

Similarly, an interaction tool shown in column (c) of FIG. 11 is to be replaced by another interaction tool shown in column (d) when the zoom ratio equals the third threshold value (40%).

For example, the first row of the interaction conversion table of FIG. 11 defines conversions of interaction tools used for manipulating outline data. Specifically, the first row of the table defines that exclusive selection buttons (used for manipulating outline data) are to be replaced by exclusive selection buttons with a scroller when the zoom ratio equals the first threshold value (80%), and that the exclusive selection buttons with the scroller are to be replaced by a "Pre" button and a "Next" button when the zoom ratio equals the third threshold value (40%).

As described above, the zoom ratio changes in response to each input of the "Reduce the overall image" instruction. The interaction conversion section 409 compares the zoom ratio with the first to third threshold values. If the relationship "first threshold value (i.e., 80%)<zoom ratio≦100%" is true, the interaction conversion section 409 selects the interaction tool shown in column (a) of FIG. 11. If the relationship "second threshold value (i.e., 60%)<zoom ratio≦first threshold value (i.e., 80%)" is true, the interaction conversion section 409 selects the interaction tool shown in column (b) of FIG. 11. If the relationship "third threshold value (i.e., 40%)<zoom ratio≦second threshold value (i.e., 60%)" is true, the interaction conversion section 409 selects the interaction tool shown in column (c) of FIG. 11. If the relationship "0%<zoom ratio≦third threshold value (i.e., 40%)" is true, the interaction conversion section 409 selects the interaction tool shown in column (d) of FIG. 11. As a result, those of the interaction tools shown in columns (a) to (d) of FIG. 11 which have been selected by the interaction conversion section 409 are displayed by the display device 405. The above-described changes in the interaction tools correspond to the changes in the controller section 102 (described with reference to FIGS. 2 to 5).

Next, the manner in which interaction tools are replaced by other interaction tools will be described with respect an exemplary interaction tool set for manipulating outline data.

The exclusive selection buttons, exclusive selection buttons with a scroller, the "Pre" button, and the "Next" button (all of which are used for manipulating outline data) are previously stored in the GUI component/graphical object storage area 403b of the storage device 403. The interaction conversion section 409 controls the function of each button as associated with the specific image data of that button. The image data of each button is controlled by the graphics process section 402. In the case where the exclusive selection buttons are to be replaced by exclusive selection buttons with a scroller at step S603, the interaction conversion section 409 performs the following process:

First, the interaction conversion section 409 obtains information concerning the positions of the exclusive selection buttons to be replaced in the window, the sizes of the exclusive selection buttons, and the operable range of the outline data. The positions of the exclusive selection buttons in the window can be obtained by inquiring to the graphics process section 402. The sizes of the exclusive selection buttons and the operable range of the outline data can be obtained by referring to the interaction conversion table. Although omitted in the interaction conversion table of FIG. 11, the interaction conversion table includes an area for storing the sizes of the exclusive selection buttons and the operable range of the outline data in the case where the interaction tools are GUI components or graphical objects.

Next, the interaction conversion section 409 reads out exclusive selection buttons with a scroller from the GUI component/graphical object storage area 403b of the storage device 403, and adapts the sizes of the exclusive selection buttons with the scroller and the operable range of the outline data to those of the exclusive selection buttons to be replaced. Thereafter, the interaction conversion section 409 requests the graphics process section 402 to draw the exclusive selection button with the scroller where the exclusive selection buttons were previously drawn. Thus, the exclusive selection buttons have been replaced by exclusive selection buttons with a scroller.

At step S604, the interaction conversion section 409 determines whether or not a given interaction tool is a GUI component. If the interaction tool is a GUI component, the size of the GUI component and the operable range of the data which the GUI component is intended to manipulate (step S605) are changed because it is necessary to reduce the size of the GUI component in response to a reduction in size of the overall image. The operable range of the GUI component is adapted to the displayed size of the GUI component. The size and operable range of the GUI component can be obtained by linear complement based on the respective sizes and operable ranges of the GUI component before and after the interaction conversion. Alternatively, the size and operable range of the GUI component can be complimented by any method other than linear complement.

At step S606, the interaction conversion section 409 determines whether or not the interaction tool is capable of directly manipulating a graphical object. If the interaction tool is capable of directly manipulating a graphical object, the interaction conversion section 409 adapts the operable range of the data to be directly manipulated and the size data of that graphical object (step S607) because it is necessary to reduce the size data of the graphical object in response to a reduction in size of the overall image. The operable range of the graphical object is adapted to the size data of the graphical object. The operable range and size data of the graphical object can be obtained by linear complement based on the respective size data and the operable ranges of the graphical object before and after the interaction conversion. Alternatively, the operable range and size data of the graphical object can be complimented by any method other than linear complement.

The present example described a case where the method of the present invention is applied to a drawing software program in which graphics and GUI components are separately presented. However, the method of the invention is also applicable to a drawing software program in which graphics and GUI components are mixedly present in the same field. Moreover, the method of the invention is also applicable to other application software programs, e.g., word processor programs, as well as drawing programs.

It will be appreciated by those skilled in the art that the method of the invention can be applied to a software program which only displays GUI components (i.e., without displaying any graphics/text) by modifying the above example so as to skip the routine for processing graphics.

EXAMPLE 2

Next, the outline of the method according to another embodiment of the invention for enabling a user to manipulate data in an interactive manner will be described with reference to FIGS. 12 to 15. The present example illustrates a case where the method of the invention is applied to a calendar application in a computer system.

FIG. 12 is a magnified view showing an overall image 801 of the calendar application displayed in one of the windows in the display region 405a shown in FIG. 1. A mouse cursor 802 is displayed for indicating a position that is selectable with the mouse 406b.

The overall image 801 in FIG. 12 shows a calendar of May 1995. As seen from FIG. 12, item names 810a, 811a, 812a, etc. of schedule objects 810, 811, 812, etc. are displayed in a calendar of May 1995. The schedule objects are classified into three categories: multiple-day schedule objects, daily schedule objects, and hourly schedule objects. A multiple-day schedule object is defined as a scheduled item occurring over a plurality of days. A daily schedule object is defined as a scheduled item occurring on a certain day. An hourly schedule object is defined as a scheduled item occurring within a certain time interval of a day.

In the exemplary calendar shown in FIG. 12, "Theme Study Meeting" 810a, "New Recruit Deployment" 811a, and "Welcome Party" 812a represent the respective item names of hourly schedule objects 810, 811, and 812. The box corresponding to May 20th shows an item name "BBQ" (820a) of an hourly schedule object 820. The arrow extending from April 30th to May 5th shows an item name "Golden Week Holiday" (830a) of a multiple-day schedule object 830. The arrow extending from May 30th to May 31st shows an item name "Symposium" (831a) of a multiple-day schedule object 831.

Next, as an illustration of one aspect of the present invention, the manner in which the display mode and the editing mode of each schedule object changes in accordance with a "Zoom in" instruction input via the input device 406, which gradually increases the zoom ratio of the overall image 801, will be described.

Herein, it is assumed that the zoom ratio increases by 1% every time a "Zoom in" instruction is input via the input device 406. However, the increment value of the zoom ratio is not limited to 1%, but can be any value which is sufficiently small for the overall image 801 to smoothly increase in size. In the present example, the "zoom ratio" is defined as [(length of one side of a box representing a day of the calendar)/(reference length)]×100, where the reference length is defined as the length of the one side of a box representing a day of the calendar taken when the overall image 801 is set to the monthly mode (shown in FIG. 12).

In the monthly mode shown in FIG. 12, only the item names of schedule objects are displayed in addition to the frames of boxes, names of days, etc. In this mode, the item name of each schedule object can be edited, and time information or duration information concerning the respective schedule objects can be changed. However, the time information can be changed only with respect to the date, not the hour, in this mode. Any change in the date of the time information can be made by directly moving the relevant object (or its "item names") to a box corresponding to the desired day.

When the zoom ratio reaches 200% by continuously "zooming in" on May 12, starting from the state shown in FIG. 12, the schedules of several days around May 12 are displayed as shown in FIG. 13. As seen from FIG. 13, each day's schedule is displayed in units or "time intervals" of 6 hours, for example.

In the mode shown in FIG. 13, any hourly schedule object is displayed in one of four time intervals (of 6 hours each) of a corresponding day. For example, the item name "Theme Study Meeting" 810a is displayed in the time interval from 6 o'clock a.m. to noon; the item name "New Recruit Deployment" 811a is displayed in the time interval from noon to 6 o'clock p.m.; and the item name "Welcome Party" 812a is displayed in the time interval from 6 o'clock p.m. to midnight. It should be noted that the item name of any daily schedule object is not displayed within a time interval, but is rather displayed in the rest of the space of the box representing each day, optionally accompanied by additional information related to the daily schedule object. For example, "The Aoyama highlands" (820b) displayed in the box of May 20 is additional information related to the daily schedule object 820. In this mode, the time information of any daily schedule object or hourly schedule object can be changed with respect to both date and hour. Any change in the date or the hour of the time information can be made by directly moving the relevant daily or hourly schedule object (or its "item names") to a box corresponding to the desired day or time interval.

Figure 14:
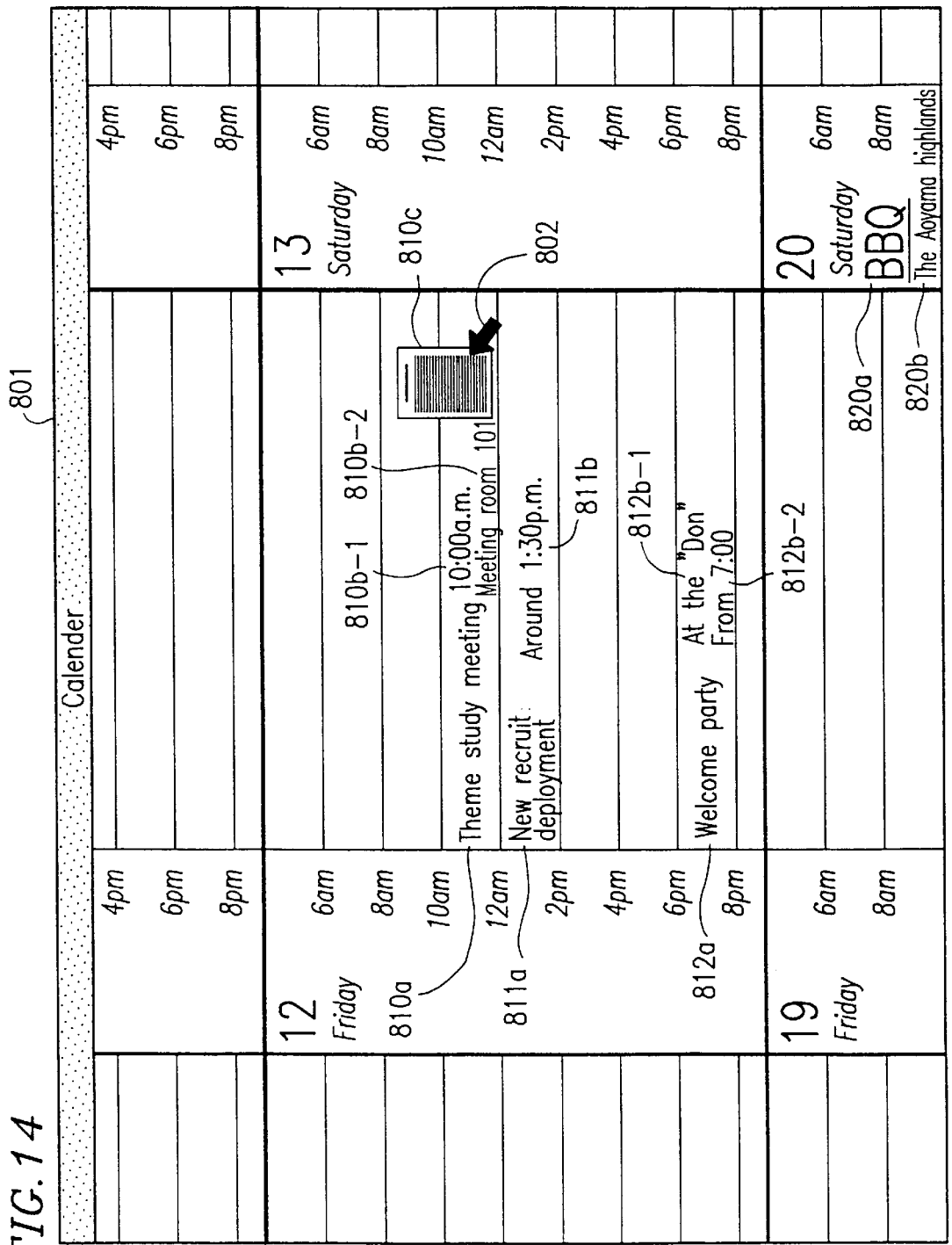
FIG. 14 illustrates one transitional state of an overall image 801 of a calendar application to which the method of the present invention is applied.

When the zoom ratio reaches 300% by continuously "zooming in" on May 12, starting from the state shown in FIG. 13, the schedules pertaining to several days around May 12 are displayed as shown in FIG. 14. As seen from FIG. 14, each day's schedule is displayed in units (i.e., "time intervals") of 2 hours, for example.

In the mode shown in FIG. 14, any hourly schedule object is displayed in one of 12 time intervals (of 2 hours each) of a corresponding day. For example, the item name "Theme Study Meeting" 810a is displayed in the time interval from 10 o'clock a.m. to noon; the item name "New Recruit Deployment" 811a is displayed in the time interval from noon to 2 o'clock p.m.; and the item name "Welcome Party" 812a is displayed in the time interval from 6 o'clock p.m. to 8 o'clock p.m. Moreover, additional information or a document associated with each daily schedule object can be displayed near the item name of each hourly schedule object. For example, additional information "10:00 a.m." (810b-1) and "Meeting Room 101" (810b-2) of the hourly schedule object 810 are displayed. Moreover, a document symbol 810c is displayed to represent an associated document of the hourly schedule object 810. The document symbol 810c indicates that there is a document related to the "Theme Study Meeting" being linked to the hourly schedule object 810. The associated document can be magnified/reduced in accordance with the zoom ratio. In the present example, the associated document is reduced on the display in the form of a symbolized application.

In this mode, the time information of any daily schedule object or hourly schedule object can be changed with respect to both date and hour. Any change in the date or the hour of the time information can be made by directly moving the relevant daily or hourly schedule object (or its "item names") to a box corresponding to the desired day or time interval, or alternatively by directly rewriting the time information indicated on the display. Furthermore, it is possible to edit the additional information of hourly schedule objects in this mode.

When the zoom ratio reaches 400% by continuously "zooming in" on the document symbol 810c starting from the state shown in FIG. 14, a word processor program is launched so that the content of the associated document linked to the hourly schedule object 810 is displayed as shown in FIG. 15. In this mode, the content of the associated document can be edited by using the word processor program.

Such switching from one application to another can be realized by using an interaction conversion table. It is also possible to selectively launch one of a plurality of applications depending on the kind of the document by using rules such as "If the document is text data then launch a word processor program".

Furthermore, interaction tools included in an application which has been launched as shown in FIG. 15 can be replaced by other interaction tools as shown in FIGS. 2 to 5. In other words, instead of switching applications corresponding to the above-described transition from FIG. 14 to FIG. 15, it is also applicable to launch an application for editing/displaying documents at the state shown in FIG. 14 and then replace interaction tools with other interaction tools in accordance with the magnification/reduction ratio of the document as described in Example 1, such replacement being controlled by the launched application.

Furthermore, when implementing the method of the present invention by a computer system incorporating a multi-window system, it is preferable to display the same domain data in a plurality of different windows having different interaction tools from one another. For example, by simultaneously displaying the image in FIG. 12 and the image in FIG. 14 on the display device 405, it becomes possible to simultaneously refer to and/or edit the monthly schedule and the detailed schedule of a particular day. The two windows, displaying the same data, can be independently magnified or reduced, with the interaction tools changing (i.e., replaced) correspondingly.

The change in the display mode and the editing mode of each schedule object described with reference to FIGS. 12 to 15 above can be realized by substituting step S603' (described below) for step S603 and skipping steps S604 and S605 in the flowchart shown in FIG. 8.

At step S603', the interaction conversion section 409 replaces each multiple-day schedule object with another multiple-day schedule object, each daily schedule object with another daily schedule object, and/or each hourly schedule object with another hourly schedule object, by referring to an interaction conversion table. By such replacement, the information of each schedule object can become displayed/hidden or editable/uneditable. The interaction conversion table is previously stored in the interaction conversion table storage area 403g of the storage device 403.

FIG. 16 shows the structure of an exemplary interaction conversion table stored in the interaction conversion table storage area 403g of the storage device 403.

In general, an "object" is a structure which encapsulates data to be controlled within the object and a specific manner for manipulating the data. The manner for manipulating the data is usually called a "method" (or "data manipulation method"). Typically, an object includes a plurality of methods for the same data, e.g., "initialize", "add", and "delete". An object is characterized by the exact "methods" that are previously provided for manipulating data to be controlled within the object, because access to data of the object using any other means than the "methods" provided within the object is prohibited.

A multiple-day schedule object includes an item name, duration information (having a specific beginning point and a specific ending point), and (optional) additional information. That is, such information is controlled within each multiple-day schedule object. A daily schedule object includes an item name, time information, (optionally) additional information, and (optionally) an associated document. That is, such information is controlled within each daily schedule object. An hourly schedule object includes an item name, time information, (optionally) additional information, and (optionally) an associated document. That is, such information is controlled within each hourly schedule object.

Now, a case will be considered where the zoom ratio is gradually increased by continuously inputting a "Zoom in" instruction via the input device 406. In this exemplary case, a schedule object including "methods" shown in column (a) of FIG. 16 is to be replaced by a schedule object including "methods" shown in column (b) when the zoom ratio equals the first threshold value (200%). Similarly, a schedule object including "methods" shown in column (b) of FIG. 16 is to be replaced by a schedule object including "methods" shown in column (c) when the zoom ratio equals the second threshold value (300%). Similarly, a schedule object including "methods" shown in column (c) of FIG. 16 is to be replaced by a schedule object including "methods" shown in column (d) when the zoom ratio equals the third threshold value (400%). The first, second, and third threshold values are previously stored in the threshold value storage area 403f of the storage device 403. It will be appreciated that the threshold values and the number of threshold values are not limited to the above-mentioned values.

For example, the fifth row of the interaction conversion table of FIG. 16 defines conversions of hourly schedule objects. Specifically, the fifth row of the table defines that a first hourly schedule object be replaced by a second hourly schedule object when the zoom ratio equals the first threshold value (200%); a second hourly schedule object be replaced by a third hourly schedule object when the zoom ratio equals the second threshold value (300%); and that a third hourly schedule object be replaced by a fourth hourly schedule object when the zoom ratio equals the third threshold value (400%). Such changes in the hourly schedule objects correspond to the changes of the overall image 801 already described with reference to FIGS. 12 to 15.

Herein, the first hourly schedule object is defined as an hourly schedule object including an "edit" method for the item name and a "change date" method for the time information. The "change date" method enables the time information to be changed with respect to the date by directly manipulating the item name of the hourly schedule object displayed on the display device 405. Since the first hourly schedule object does not include any methods for additional information or associated documents, additional information and associated documents are not displayed. Furthermore, since the first hourly schedule object does not include a "change hour" method for time information, any change in hour of the time information is prohibited. Each "-" symbol in FIG. 16 indicates the lack of methods for manipulating the corresponding information.

The second hourly schedule object is defined as an hourly schedule object including an "edit" method for the item name and a "change date" method and a "change hour" method for the time information. The "change hour" method enables the time information to be changed with respect to the hour by directly manipulating the item name of the hourly schedule object displayed on the display device 405. Since the second hourly schedule object does not include any methods for additional information or associated documents, additional information and associated documents are not displayed.

The third hourly schedule object is defined as an hourly schedule object including an "edit" method for the item name, a "change date" method and an "change hour" method for the time information, an "edit" method for the additional information, and a "display symbol" method for the associated document. The "display symbol" method enables any associated document linked to the hourly schedule object to be displayed as a symbol.

The fourth hourly schedule object is defined as an hourly schedule object including a "launch word processor program" method for the associated document. Since the fourth hourly schedule object does not include any methods for information other than associated documents, any information other than associated documents is not displayed. The "launch word processor program" method enables a predetermined word processor program to be launched and the associated document linked to the hourly schedule object to be read into the predetermined word processor program.

Next, it will be described how hourly schedule objects are replaced according to the present example by illustrating the case of the hourly schedule object 810 having the item name "Theme Study Meeting". The same principle also applies to the replacement of multiple-day schedule objects or daily schedule objects.

The hourly schedule object 810 is either the first hourly schedule object 810-1, the second hourly schedule object 810-2, the third hourly schedule object 810-3, or the fourth hourly schedule object 810-4, selected by the interaction conversion section 409 in accordance with the zoom ratio. Herein, the first to fourth hourly schedule objects 810-1 . . . 810-4 include methods described in columns (a) to (d), respectively, of FIG. 16. The first to fourth hourly schedule objects 810-1 . . . 810-4 are previously stored in the schedule object storage area 403h of the storage device 403.

Figure 17:
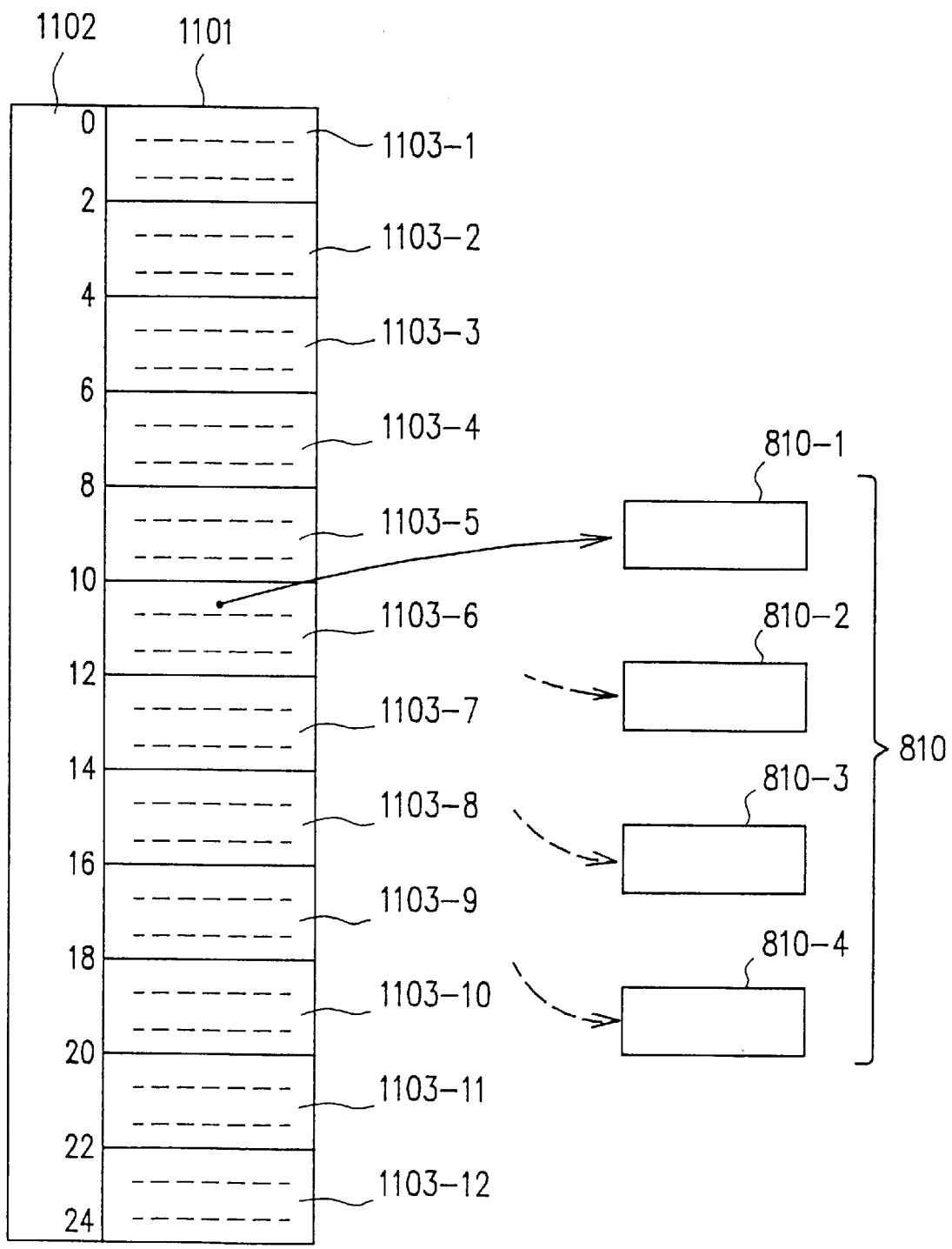
FIG. 17 shows the structure of calendar data of a calendar application.

FIG. 17 shows an exemplary structure of calendar data in the calendar application. The calendar data is stored in the calendar data storage area 403i of the storage device 403. For conciseness, only the structure of calendar data 1101 corresponding to May 12 is shown in FIG. 17.

The calendar data 1101 includes a day pointer area 1102 for storing a pointer to a daily schedule object and twelve hour pointer areas 1103-1 to 1103-12 for each storing a pointer to an hourly schedule object. The hour pointer areas 1103-1 to 1103-12 correspond to the respective two-hour time intervals. For example, the pointer area 1103-1 corresponds to the time interval from midnight to 2 o'clock a.m. Each of the hour pointer areas 1103-1 to 1103-12 is further divided into a plurality of areas.

In the state shown in FIG. 12, the hourly schedule object 810 is the first hourly schedule object 810-1. Herein, it is assumed that the "Theme Study Meeting" is scheduled for the time interval from 10:00 a.m. to noon of May 12. In this case, the interaction conversion section 409 stores a pointer to the first hourly schedule object 810-1 in the pointer area 1103-6.

The interaction conversion section 409 compares the current zoom ratio with the first threshold value (200%). If the zoom ratio equals the first threshold value (200%), the interaction conversion section 409 reads out the second hourly schedule object 810-2 from the schedule object storage area 403h of the storage device 403, and stores a pointer to the second hourly schedule object 810-2 in the pointer area 1103-6. Thus, the first hourly schedule object 810-1 has been replaced by the second hourly schedule object 810-2.

Similarly, the second hourly schedule object 810-2 can be replaced by the third hourly schedule object 810-3 by storing a pointer to the third hourly schedule object 810-3 in the pointer area 1103-6. Similarly, the third hourly schedule object 810-3 can be replaced by the fourth hourly schedule object 810-4 by storing a pointer to the forth hourly schedule object 810-4 in the pointer area 1103-6.

The above-described example achieves interaction conversion by replacing the first schedule objects having the first method(s) by the second schedule objects having the second method(s) (at least some of which are different from the first method(s)) when the zoom ratio reaches a predetermined threshold value, and so on. However, it is also applicable to achieve interaction conversion by preparing a single object including all the methods described in columns (a) to (b) of FIG. 16 and selectively activating only the method(s) to be used in the particular zoom ratio range. In that case, a given method can be indicated as activated or deactivated by, for example, a permissibility flag region provided within the object, such that the value of the permissibility flag region of each method is updated according to the zoom ratio. For example, if the permissibility flag region has a value "1", the user is permitted to use the corresponding method, and if the permissibility flag region has a value "0", the method is prohibited. Thus, it becomes possible to selectively activate only the particular methods included by a given object.

In the above-described case of interaction conversion based on activation/deactivation of methods, the number of objects stored in the storage device 403 can be reduced as compared with the case where interaction conversion is achieved by object replacement, thereby enhancing the memory efficiency and process efficiency. Moreover, the interaction conversion based on activation/deactivation of methods is more "object-oriented" because one "item" is expressed by one "object".

Furthermore, it is possible to interpret each method as an interaction tool for manipulating data, thereby interpreting each multiple-day schedule object, each daily schedule object, and each hourly schedule object as a complex of various interaction tools.

The interaction conversion section 409 generates a conversion timing signal when the zoom ratio reaches a predetermined threshold value. Each object converts the interaction tool (or method) in response to the conversion timing signal issued by the interaction conversion section 409.

In the above-described example, the interaction conversion table is stored in the storage device 402 separately from the objects. However, it is also applicable to store an interaction table within each object. In that case, zoom ratio values can be supplied to each object as "messages" instead of the above-mentioned conversion timing signals, and each object is in charge of interpreting the zoom ratio values so as to either convert or not convert a given interaction tool in response to the zoom ratio value supplied thereto.

As described above, according to the present invention, it is possible to automatically convert interaction tools in a GUI environment in response to a predetermined input or series of continuous inputs from a user.

The method of the present invention can convert interaction tools including tangibles, e.g., GUI components and graphical objects, as well as intangibles, e.g., implicitly assigned operations. Furthermore, a set of a number of interaction tools can also be regarded as one interaction tool according to the present invention. Thus, the present invention provides a universal interaction tool set in a zoomable GUI environment.

EXAMPLE 3

Hereinafter, a multi-window display device according to Example 3 of the present invention will be described with respect to FIG. 18.

Figure 18:
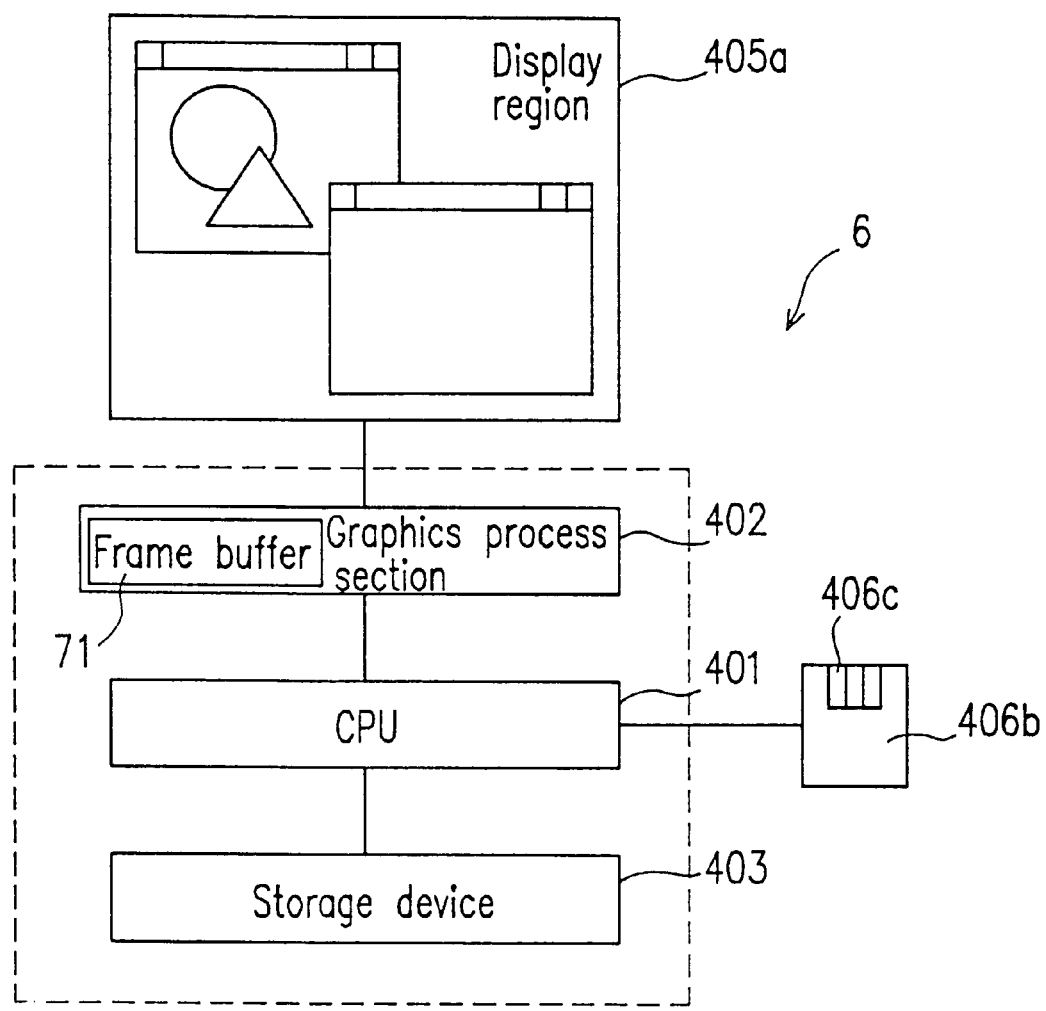
FIG. 18 is a block diagram showing the construction of a multi-window display device according to an example of the present invention.

FIG. 18 shows the construction of a multi-window display device according to the present example. As shown in FIG. 18, the multi-window display device includes a CPU 401, a graphics process section 402 (including a frame buffer 71), a storage device 403, and a display device (not shown)

including a display region 405a. The multi-window display device of the present example further includes a pointing device such as a mouse 406b and a keyboard (not shown).

For conciseness, it is assumed that the multi-window display device in FIG. 18 only includes the mouse 406b as a pointing device. The mouse 406b and the storage device 403 are coupled to the CPU 401. The CPU 401 is coupled to the graphics process section 402.

The mouse 406b is used for designating a region in a window region. Specifically, when a user wishes to open a new window on the display region 405a, the user uses the mouse 406b to designate a beginning point and an ending point of the new window to be opened. The CPU 401 generates the new window based on the position designation data (including the designated beginning point and ending point). The CPU 401 then writes the display content after being thus processed into the frame buffer 71. The display region 405a displays the display content retained in the frame buffer 71. Thus, the user is able to open a new window by designating a beginning point and an ending point in the display region 405a.

In the present example, the beginning point and ending point are defined in terms of the coordinates of diagonal corners of a given window (assuming that each window is rectangular). Alternatively, it is applicable to utilize the center of a rectangular window and any corner of the window instead of the beginning point and ending point.

The storage device 403 stores information concerning data to be displayed (hereinafter referred to as "display data") and windows. The CPU 401 displays in a new window (designated with the mouse 406b in terms of its beginning point and ending point display data) part or all of the display data corresponding to the new window. The CPU 401 can then optionally perform operations such as clipping or coordinate transforms.

FIGS. 23 to 30 illustrate exemplary displayed images describing operations of the multi-window display device according to the present example.

Figures 23, 24:
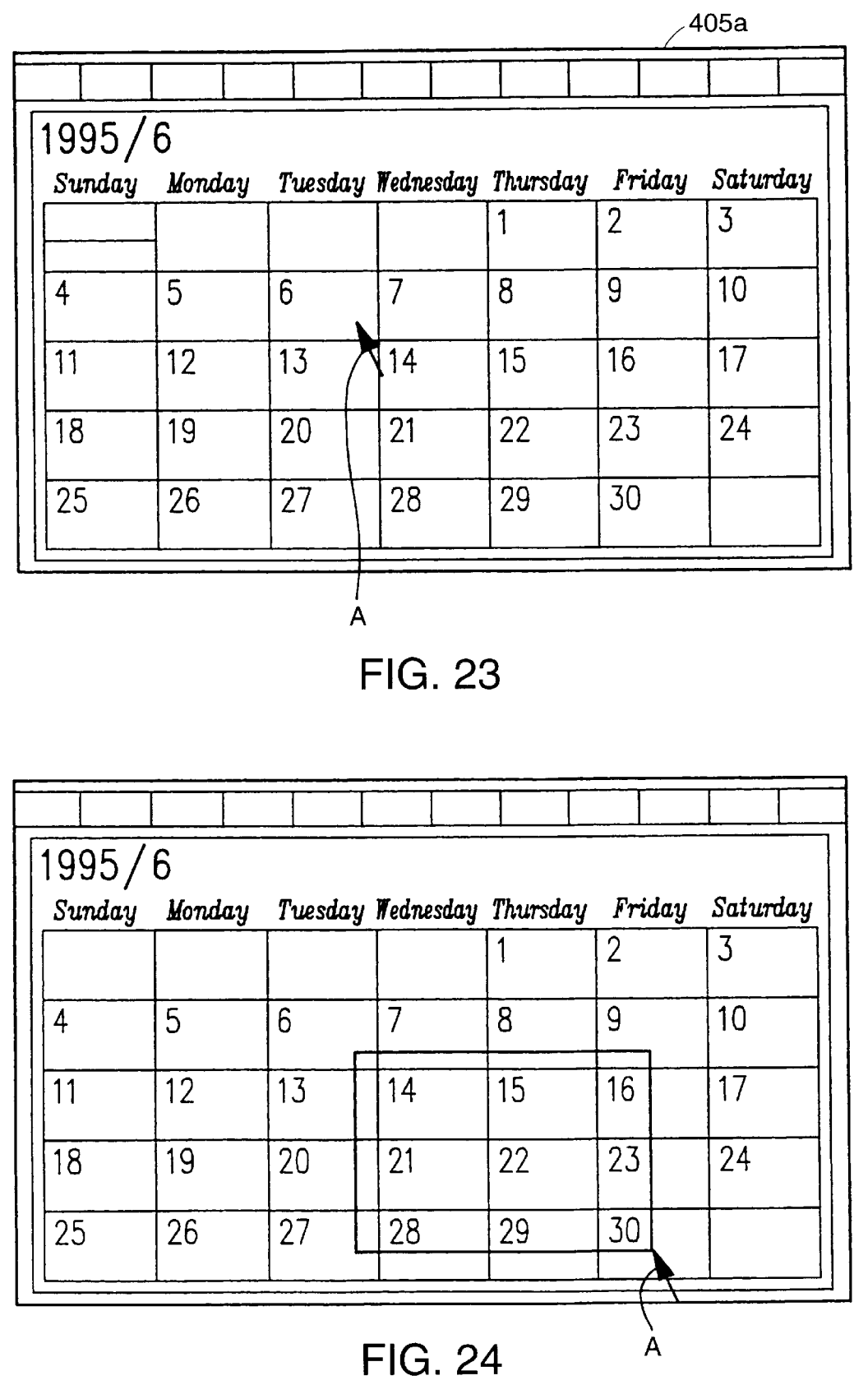

FIG. 23 illustrates an exemplary displayed image, from which an operation for designating a region to become a new window with the use of the mouse 406b (FIG. 18) is begun. As shown in FIG. 23, a beginning point of region designation is indicated by an arrow A on the display region 405a with a pointing device such as the mouse 406b, and then a button or the like is pressed to indicate the beginning of a region designation process. The button for indicating the beginning of a region designation process can be any button of the pointing device (e.g., the mouse 406b) or any button of another input device such as a keyboard.

FIG. 24 illustrates an exemplary displayed image, at which an operation for designating a region to become a new window with the mouse 406b is finished. During the region designation process, a so-called rubber band indicates a rectangular area defined by the beginning point and the position of the arrow A located diagonally with respect to the beginning point. Thus, the ending point of region designation is indicated by the position of the arrow A in FIG. 24, and a predetermined button for indicating the end of the region designation is pressed to complete the region designation process.

In the above illustration of how to indicate the beginning and end of region designation, it is also applicable to press a "region designation button" to indicate the beginning of the region designation and then release the "region designation button" to indicate the end of the region designation, instead of pressing a "region-designation beginning button" and pressing a "region-designation end button", for example.

Figures 25, 26:
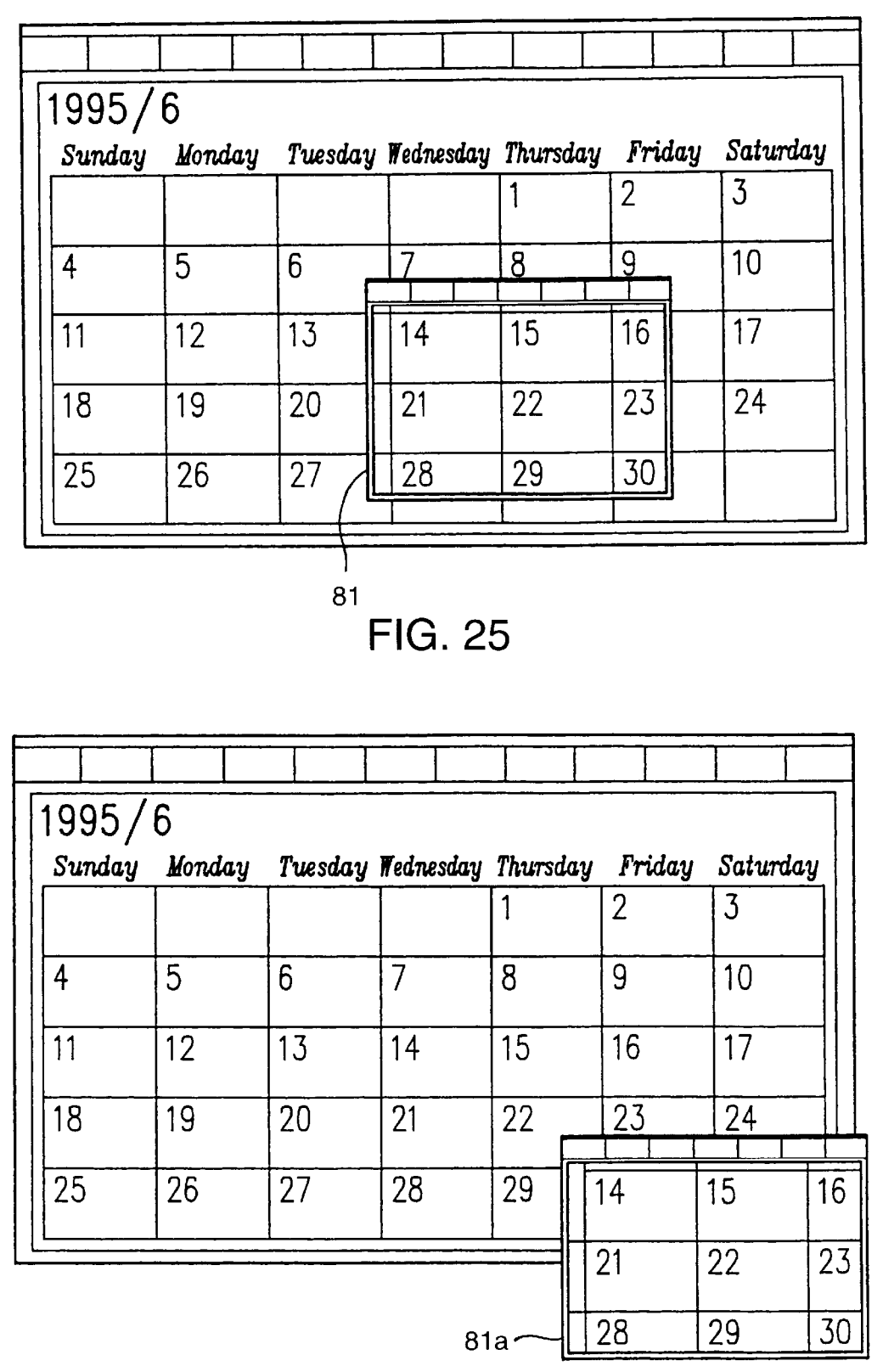
Figures 27, 28:
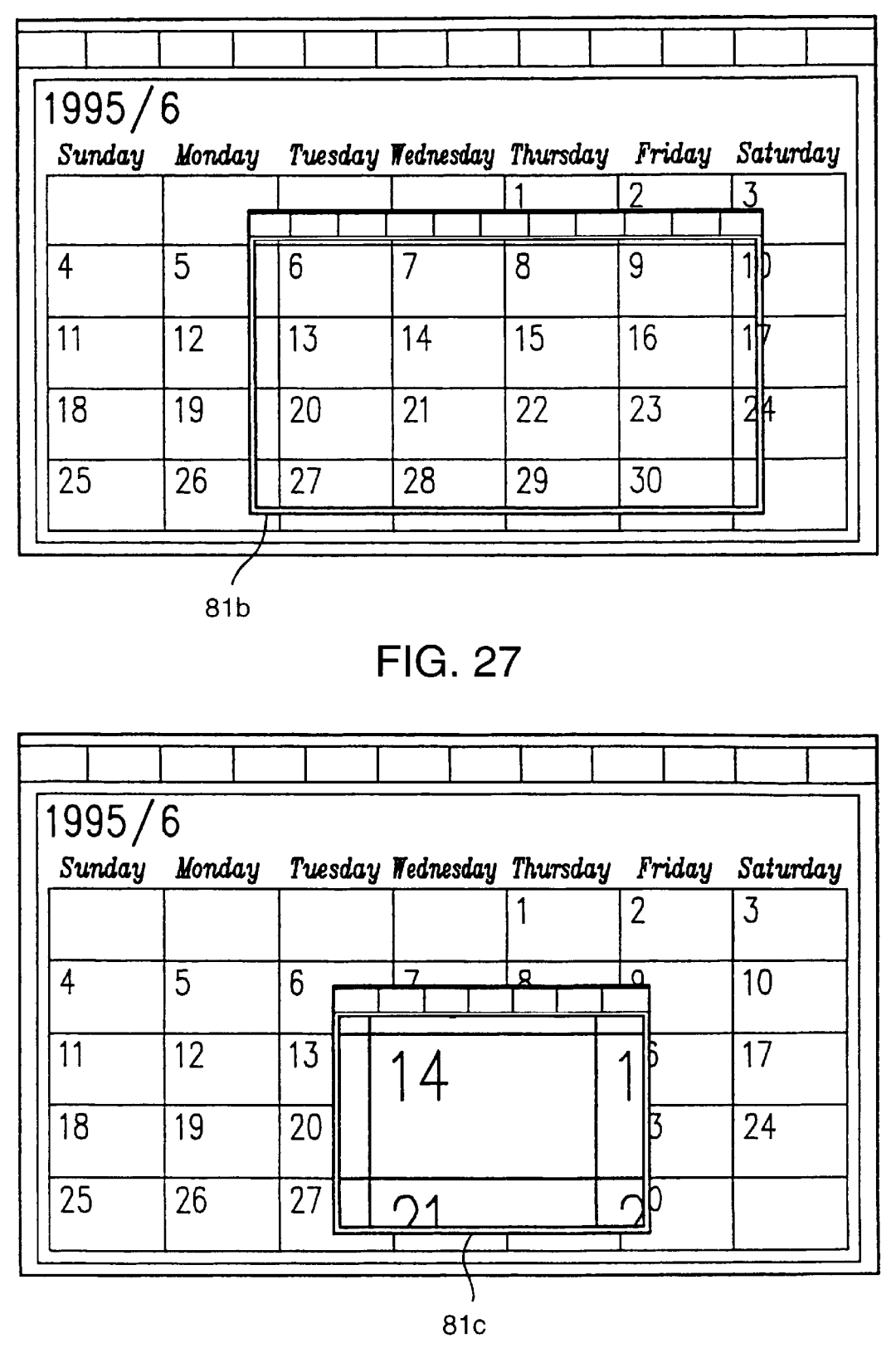

FIG. 25 illustrates an exemplary displayed image, in which a new window 81 has opened in a designated area as the region designation process is finished. In FIG. 25, the display content, the magnification ratio, etc., of the new window 81 are identical with those of what was previously displayed in the designated area. It will be appreciated that, as in the case of any other window, the new window 81 shown in FIG. 25 can be moved (indicated as 81a in FIG. 26), changed in size (indicated as 81b in FIG. 27), or have its display content altered (indicated as 81c in FIG. 28, where the magnification ratio is increased), according to varying needs of the user.

Since the display contents of the original window and the new window 81 are generated from the same display data, any change in the display data in one window is reflected in the other window as well.

Figure 29:
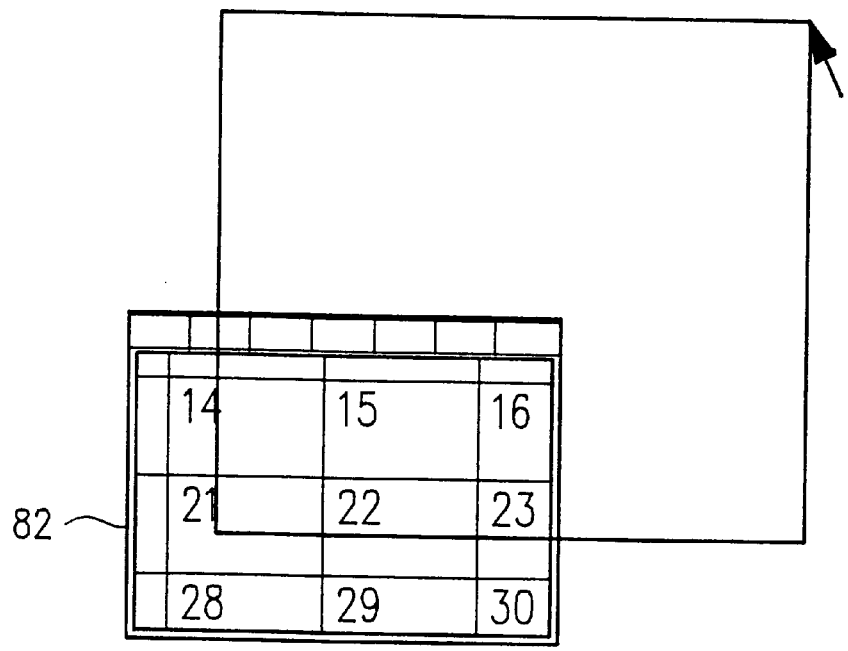
FIG. 29 illustrates an exemplary displayed image in which the region of a designated new window lies partially outside an original window.
Figure 30:
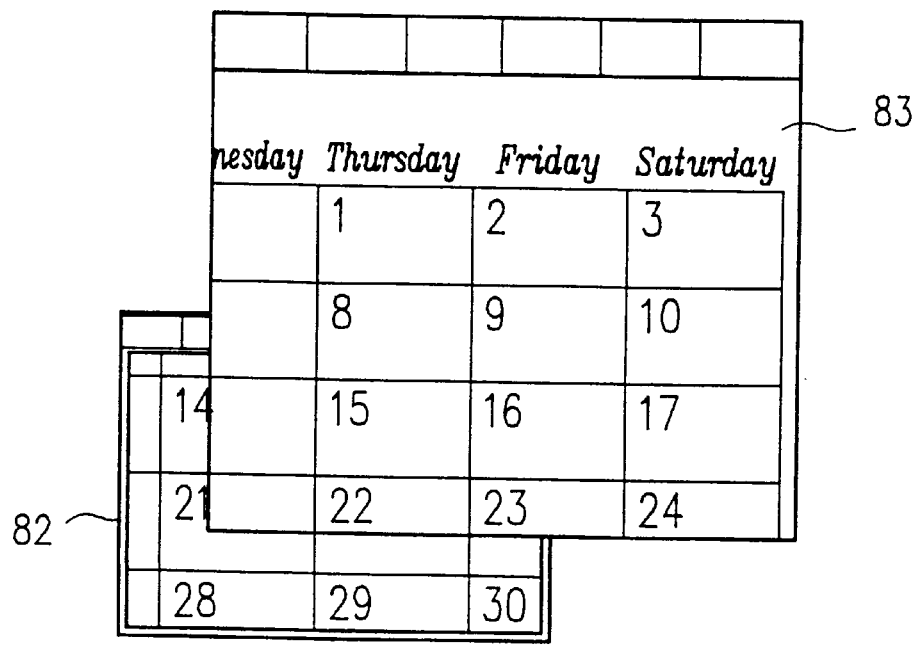
FIG. 30 illustrates an exemplary displayed image in which the display data of part of a designated new window lying partially outside an original window is also displayed.

In the case where the designated region lies partially outside the original window as shown in FIG. 29 (where 82 indicates the original window), it is possible to display the display data which was previously outside the window and therefore undisplayed as indicated by 83 in FIG. 30, thereby allowing the user to review the content which was previously undisplayed, e.g., data pertaining to some other weekend. The window 82 in FIGS. 29 and 30 may itself be a newly-opened window derived from an original window shown in FIG. 25, or may simply be the original window in FIG. 25 reduced in size.

Hereinafter, an operation of the multi-window display device shown in FIG. 18 is described with reference to FIG. 19.

Figure 19:
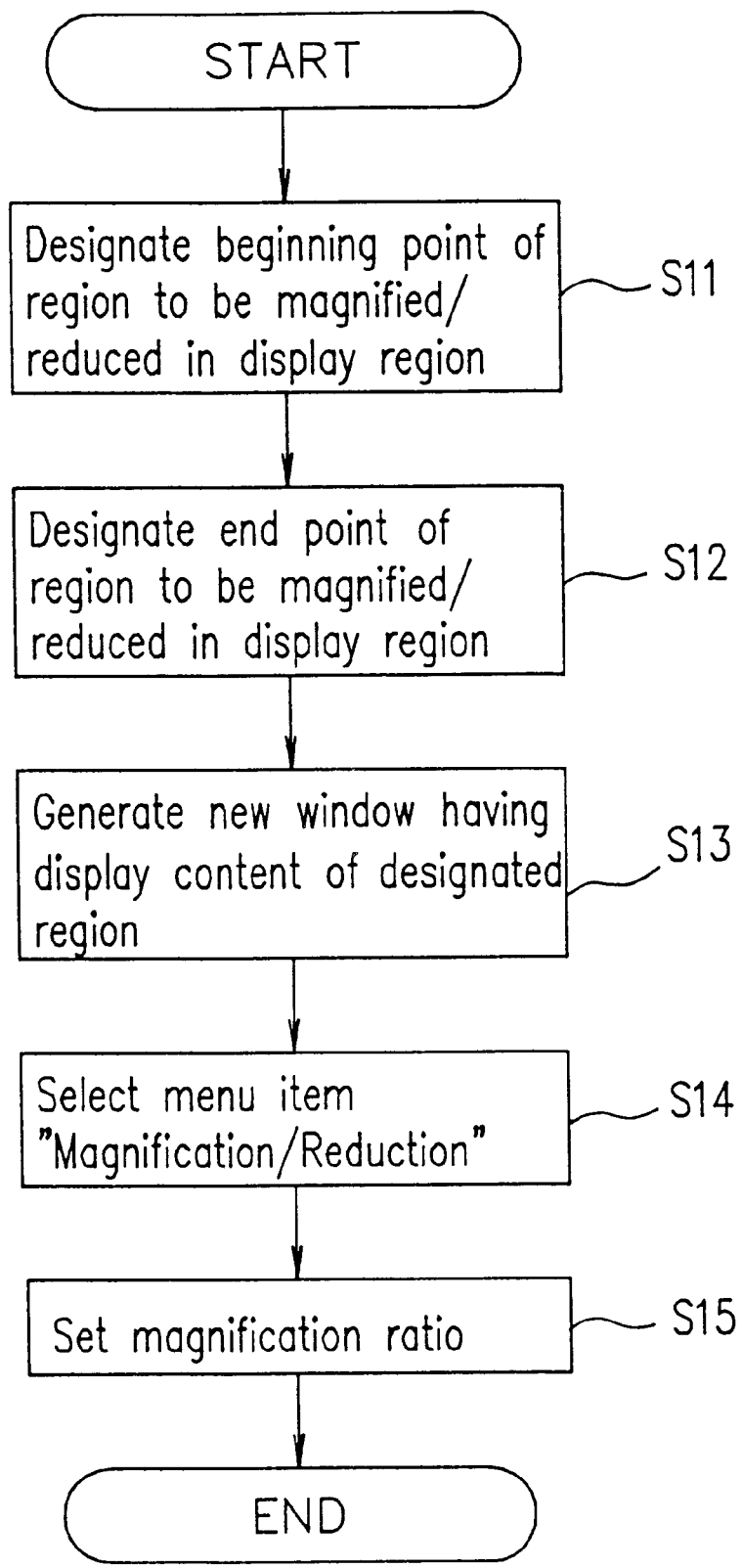
FIG. 19 is a flowchart showing an operation of the multi-window display device in FIG. 18.

FIG. 19 is a flowchart showing an operation of the multi-window display device in FIG. 18. Through this operation, a new window is opened in the display region 405a. For conciseness, it is assumed that any new window illustrated in this exemplary operation maintains a constant size, i.e., the size defined by its beginning point and ending point designated by the user, after being opened.

At step S11, a user designates a coordinate of a new window to be opened (e.g., a beginning point) in the display region 405a by using the mouse 406b. At step S12, the user designates a coordinate of the new window to be opened (e.g., an ending point) in the display region 405a by using the mouse 406b.

At step S13, the CPU 401 transmits (or "clips") the data of a region designated by the beginning point and the ending point as indicated by the mouse 406b to the storage device 403. An optional operation such as coordinate transform can be performed concurrently with or subsequent to the clipping of the data of the designated region to the storage device 403. The CPU 401 writes the above-mentioned data of the designated region (clipped in the storage device 403) and a window frame in the frame buffer 71. The data written in the frame buffer 71 is then displayed in the display region 405a. Thus, a new window has been generated which includes the display content of the region having coordinates designated by the use of the mouse 406b.

At step S14, the user selects a menu item "Magnification/Reduction" shown in the display region 405a with the mouse 406b. At step S15, the user sets the magnification ratio of the data to be displayed in the new window. For example, if the user sets a magnification ratio of ×a times, the data of the designated region is multiplied ×a times, so that a portion of the ×a times multiplied data of the designated region is displayed in the entire window.

When the user wishes to vary the size of the designated region and the frame size of the window, the magnification ratio can be set in response to a click on a "Zoom-in" or "Zoom-out" icon or item in the "Magnification/Reduction" menu with the mouse 406b. The size of the window frame displayed in the display region 405a continuously changes in response to a continuous change in the magnification ratio of the window. The vertical and horizontal dimensions of the window change proportionately to the change in the magnification ratio. Once a new magnification ratio is set, the CPU 401 magnifies or reduces the display data and writes the magnified/reduced data into the frame buffer 71 so as to display a window of a size in accordance with the new magnification ratio in the display region 405a. As a result, the content stored in the frame buffer 71 is displayed in the display region 405a.

Since the CPU 401 is capable of relatively quick operation, the designated region as selected in terms of the beginning point and ending point can be continuously magnified or reduced by the CPU 401 in real time.

As will be appreciated, the multi-window display device in FIG. 18 does not require a user who wishes to open a new window out of any region in the display region 405a and magnify or reduce the new window by a certain magnification ratio to perform all of: select a "New window" icon or item from a menu to generate a new window; select an "Open" icon or item from a menu to open the new window; select a "Move display region" icon or item from a menu to move the new window; and select a "Magnification/Reduction" icon or item from a menu to magnify or reduce the new window.

Instead, the multi-window display device in FIG. 18 allows a beginning point (coordinates) and ending point (coordinates) to be designated, whereby a new window can be opened easily, quickly, and smoothly. Furthermore, by selecting a "Magnification/Reduction and Magnification ratio" icon or item, the new window can be obtained at the optimum magnification ratio.

Hereinafter, the CPU 401 and the storage device 403 of the multi-window display device in FIG. 18 will be described in more detail with reference to FIG. 20.

Figure 20:
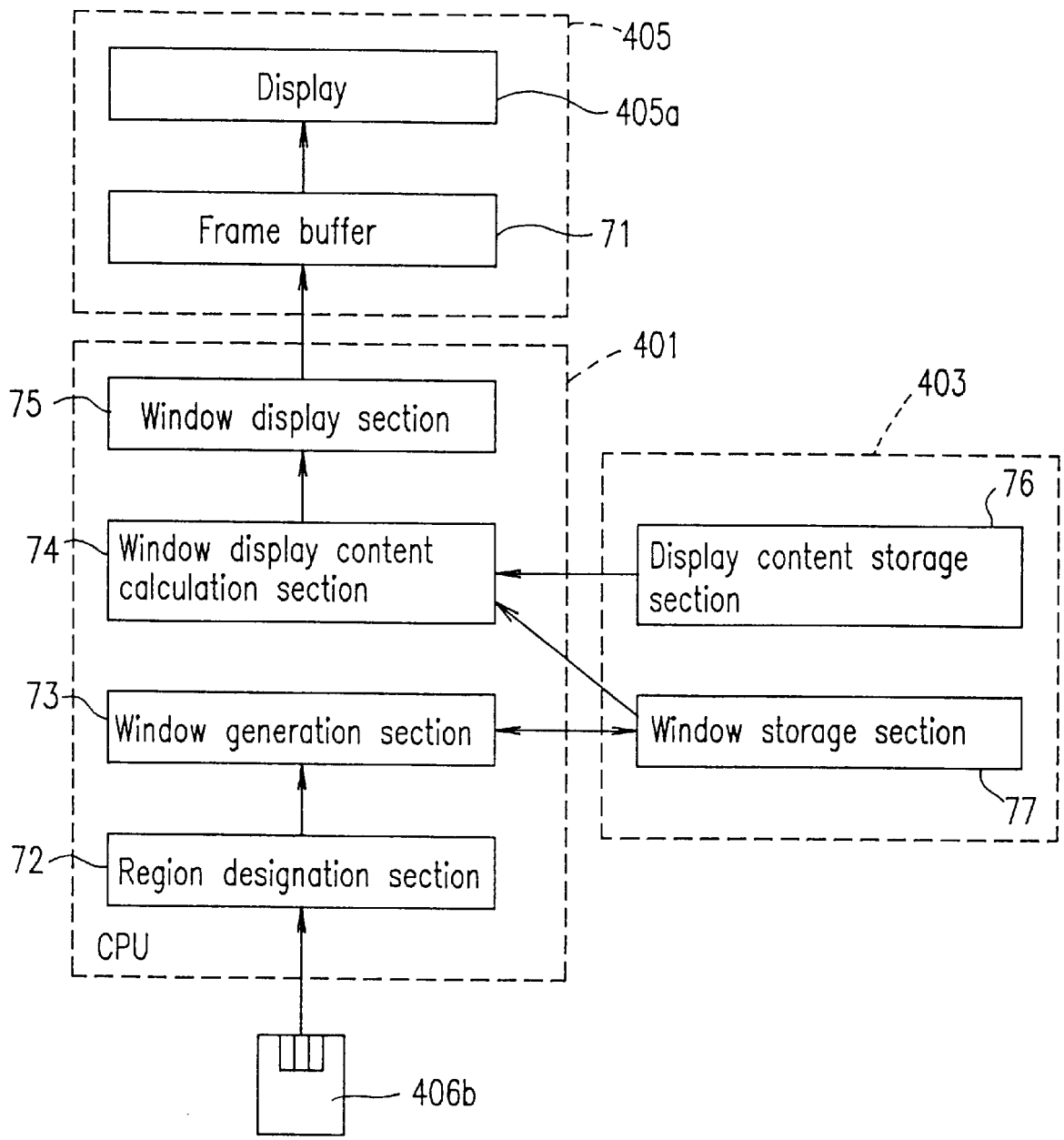
FIG. 20 is a functional block diagram showing the CPU 401 and the storage device 403 in FIG. 18 in detail.

As shown in FIG. 20, the storage device 403 includes a display content storage section 76 (as a first storage section) and a window storage section 77 (as a second storage section). The display content storage section 76 stores display data to be displayed in each window. The window storage section 77 stores the information concerning the windows, e.g., the sizes and positions of windows, as well as coordinates of the display region in which display data is to be displayed.

A region designation section 72 is coupled to the mouse 406b so as to receive information of operations made by a user with the mouse 406b. When generating a new window, the user inputs the coordinates of the beginning point and the ending point to the multi-window display device in FIG. 18 by using the mouse 406b. Thus, the region designation section 72 stores the coordinates of the beginning point and the ending point (within the display region 405a) designated by the user.

A window generation section 73 is coupled to the region section 72 and the window storage section 77. The window generation section 73 generates the position and size of the window based on the input coordinates of the beginning point and the ending point.

The display content storage section 76 stores display data. The display content storage section 76 is coupled to a window display content calculation section 74. The window storage section 77 stores the sizes and positions of windows, coordinates of display data, magnification ratios, and the like. The window storage section 77 is coupled to the window display content calculation section 74.

The window display content calculation section 74 receives information such as the display data from the display content storage section 76, and receives information such as the sizes and positions of windows, coordinates of display data, magnification ratios, etc. from the window storage section 77. The window display content calculation section 74 performs a coordinate transform for the coordinates of the display data by using a magnification ratio of the data. The coordinates of the display data after the coordinate transform and the display data are sent to a window display section 75.

The window display section 75 generates the content of the window region to be displayed in the display region 405a based on the coordinates of the display data after the coordinate transform and the display data. The window display section 75 stores the generated window in the frame buffer 71.

The generated window, in accordance with the data stored in the frame buffer 71, is displayed in the display region 405a.

Figure 21:
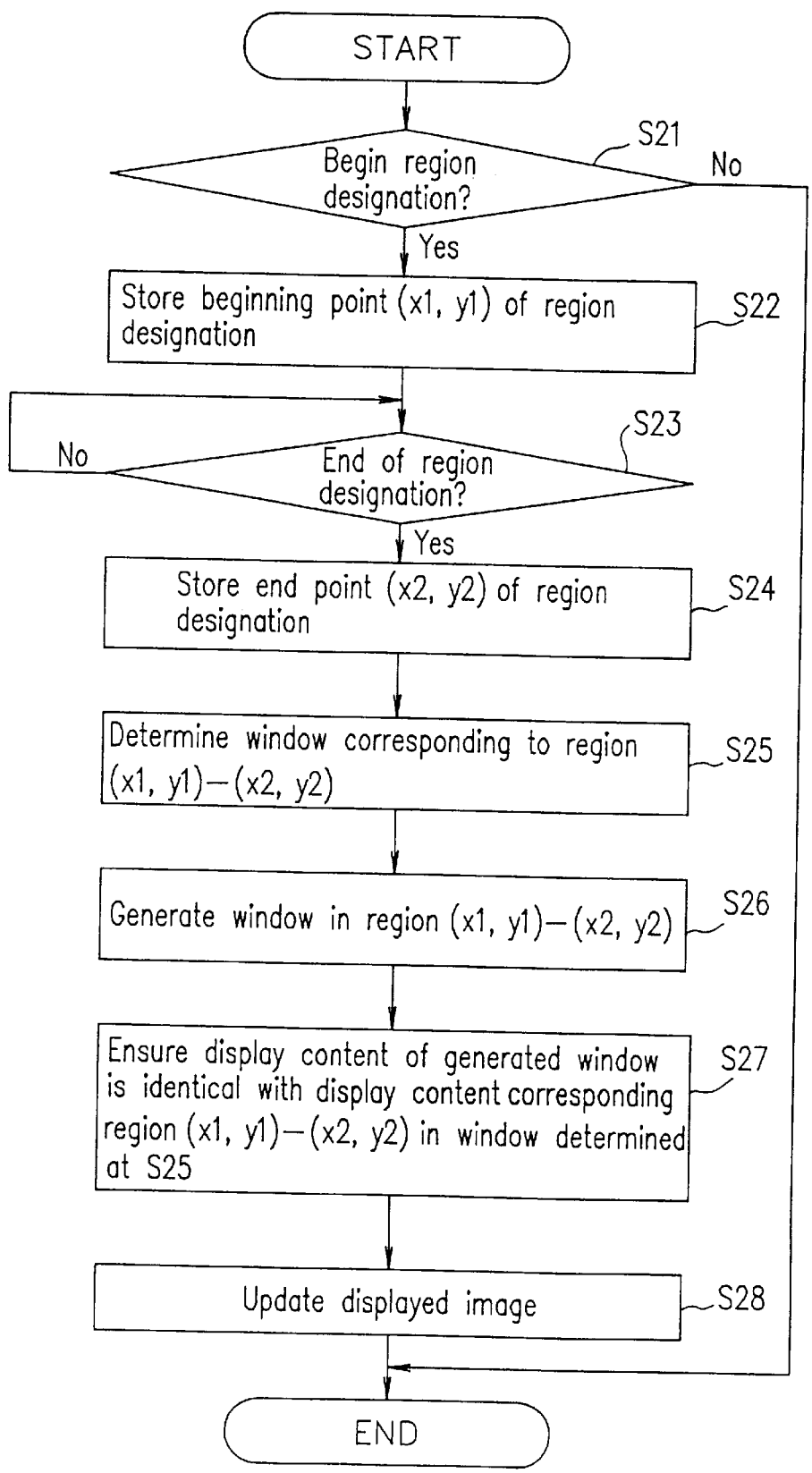
FIG. 21 is a flowchart showing an operation of the multi-window display device in FIG. 20.

Hereinafter, an operation of the multi-window display device in FIG. 20 will be described with reference to FIG. 21. For conciseness, the flowchart of FIG. 21 illustrates an operation of opening a new window including a portion of the display content of an original window at the same magnification ratio (as exemplified in FIG. 25).

At step S21, the region designation section 72 determines whether or not a region corresponding to a new window has been designated by using the mouse 406b. The region designation step is begun by a depression of a button 406c of the mouse 406b, for example.

If it is determined at step S21 that the region designation step has not begun, the process is terminated at END, where a further event is waited for.

If it is determined at step S21 that a region designation step has begun, the coordinates (x1, y1) of the beginning point as designated at step S22 are supplied to the region designation section 72. Specifically, any position in the display region 405a that is indicated by the mouse 406b when the pressed button 406c of the mouse 406b is released defines the coordinates (x1, y1) of the beginning point. It is also applicable to define the coordinates (x1, y1) of the beginning point as any position in the display region 405a that is indicated by the mouse 406b when the button 406c of the mouse 406b is pressed down.

At step S23, the coordinates (x2, y2) of the ending point are set by the user with the mouse 406b. The coordinates (x2, y2) of the ending point are finalized by a depression of the button 406c of the mouse 406b at any position in the display region 405a. Specifically, any position in the display region 405a that is indicated by the mouse 406b when the pressed button 406c of the mouse 406b is released defines the coordinates (x2, y2) of the ending point. It is also applicable to define the coordinates (x2, y2) of the ending point as any position in the display region 405a that is indicated by the mouse 406b when the button 406c of the mouse 406b is pressed down.

The region designation section 72 determines whether or not the region designation for a new window has been finished. The region designation for a new window is finished in response to a release of the pressed button 405c of the mouse 406b, for example. If the region designation for a new window has not been finished, the determination at step S23 is repeated until the region designation for a new window is finished. If the region designation for a new window has been finished, the coordinates (x2, y2) of the designated ending point are supplied to the region designation section 72 at step S24.

At step S25, the window generation section 73 determines the display data to be displayed in a window region defined by the coordinates (x1, y1) of the beginning point (stored at step S22) and the coordinates (x2, y2) of the ending point (stored at step S24) in view of the information stored in the window storage section 77, e.g., the sizes and positions of windows, and overlapping between windows.

A window region as defined in the present example is a rectangular window region having diagonal corners at the coordinates (x1, y1) (i.e., the beginning point stored at step S22) and the coordinates (x2, y2) (i.e., the ending point stored at step S24).

As to which one of a plurality of windows displayed at the same time is subjected to region designation, it is applicable to display part or all of the display data of a window having the largest area in the display region 405a in the new window. Alternatively, it is applicable to display part or all of the display data of any topmost window (i.e., not hidden by any other window) that is located in a position corresponding to the coordinates (x1, y1) of the beginning point in the new window. Alternatively, it is also applicable to display part or all of the display data of any topmost window (i.e., not hidden by any other window) that is located in a position corresponding to the coordinates (x2, y2) of the ending point in the new window.

It is also possible for the user to select one of the plurality of windows displayed by the multi-window display device of the present invention.

The size and position of the window generated by the window generation section 73 are stored in the window storage section 77.

At step S26, a window (as contoured by a window frame, etc.) is generated in the region defined by the coordinates (x1, y1) (i.e., the beginning point) and the coordinates (x2, y2) (i.e., the ending point).

At step S27, the window generation section 73 displays the display data corresponding to the window determined at step S25 in the window generated at step S26 at the same magnification ratio as that of the window determined at step S25. The window generation section 73 ensures that the coordinates of the display data corresponding to the window determined at step S25 (as designated in terms of the beginning point and the ending point) are identical with the coordinates of the display data displayed in the window generated at step S26. As a result, the display content of the newly generated window is made identical with the display content corresponding to the window determined at step S25 (cf. FIG. 25). However, the user may optionally magnify or reduce the size of the newly generated window.

Figure 22:
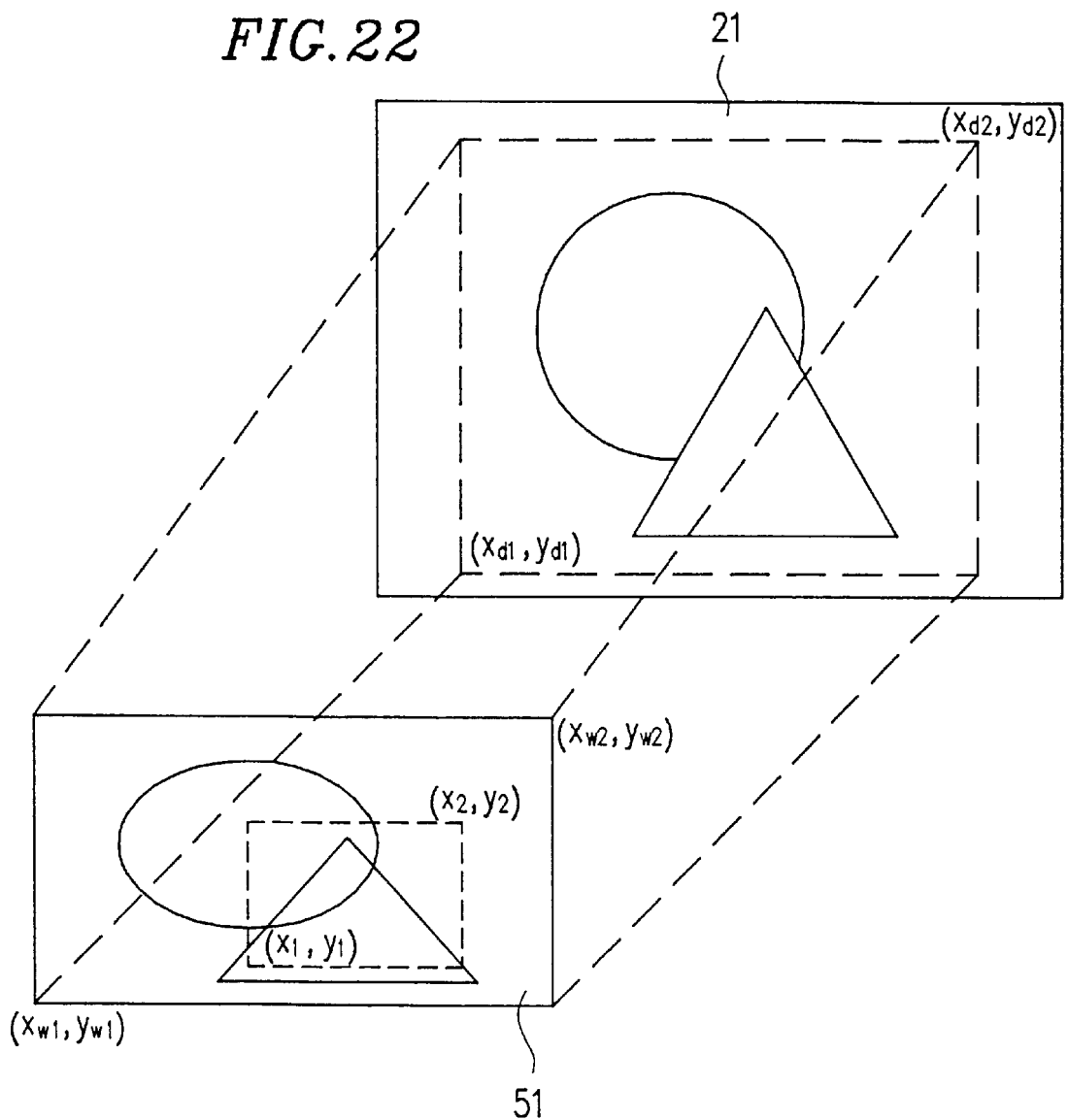
FIG. 22 is a schematic diagram illustrating the process at step 27 in FIG. 21.

FIG. 22 is a schematic diagram illustrating the process at step 27 in FIG. 21.

As shown in FIG. 22, the window storage section 77 stores display offset values $(x_{d1}, y_{d1})$, $(x_{d2}, y_{d2})$, $(x_{w1}, y_{w1})$, and $(x_{w2}, y_{w2})$, along with a horizontal magnification ratio $sh=(x_{w2}-x_{w1})/(x_{d2}-x_{d1})$ and a vertical magnification ratio $sv=(y_{w2}-y_{w1})/(y_{d2}-y_{d1})$, in order for the conversion of a region $(x_{d1}, y_{d1})$-$(x_{d2}, y_{d2})$ of an original window 21 into a region $(x_{w1}, y_{w1})$-$(x_{w2}, y_{w2})$ of a new window 51. By using these values, coordinates $(x_d, y_d)$ of display data are converted into coordinates $(sh(x_d-x_{d1})+x_{w1},\ sv(y_d-y_{d1})+y_{w1})$ of the new window 51.

Conversely, coordinates $(x_w, y_w)$ in the new window 51 are converted into coordinates $((x_w-x_{w1})/sh+x_{d1}, (y_w-y_{w1})/sv+y_{d1})$.

Thus, corresponding to the region $(x_1, y_1)$-$(x_2, y_2)$ stored at steps S22 and S24, offset values $((x_1-x_{w1})/sh+x_{d1}, (y_1-y_{w1})/sv+y_{d1})$ and $(x_1, y_1)$ are stored in the window storage section 77. As a result, the display content of the window generated at step S26 can become identical with the display content corresponding to the designated region $(x_1, y_1)$-$(x_2, y_2)$ in the window determined at step S25.

Although a coordinate transform is performed based on display offset values and magnification ratios stored in the window storage section 77 in the above example, it is also applicable to perform a coordinate transform through a matrix operation for a transform matrix stored in the window storage section 77.

As for the specific method for region designation using the mouse 406b, it is also applicable to utilize the center of a target window and any corner of the target window instead of the beginning point and ending point, assuming that the windows are rectangular. By this method of region designation, it becomes possible to indicate the center of magnification or reduction at the time of selecting the beginning point (i.e., the center of the window). By this method, a rectangular region designated by the coordinates (X0, Y0) of a center and a corner (X1, Y1) is identical with a rectangular region having diagonal corners at coordinates (X1, Y1) and (X0–X1, Y0–Y1).

Thus, according to the present example, it is possible to generate a window having display content corresponding to a region selected by a user in a smooth, quick, and more instinctual operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for enabling a user to interactively manipulate data retained in a computer system, the method comprising the steps of:

comparing a variable value with a predetermined threshold value, the variable value varying in accordance with a predetermined instruction which is input to the computer system;

selectively converting, in accordance with the result of comparison of the variable value with the predetermined threshold value, an interaction tool providing a method for manipulating the data into another interaction tool providing a different method for manipulating the same data; and displaying the selectively converted interaction tool.

2. The method according to claim 1, wherein the step of displaying the selectively converted interaction tool includes changing, in accordance with the predetermined instruction, a displayed image of the selectively converted interaction tool.

3. A method according to claim 1, wherein the steps of comparing a variable value with a predetermined threshold value, selectively converting an interaction tool, and displaying the selected interaction tool, are repeated continuously.

4. A computer system comprising:

input means for inputting a predetermined instruction;

a comparator for comparing a variable value with a predetermined threshold value, the variable value varying in accordance with a predetermined instruction which is input via the input means;

a selector for selectively converting, in accordance with the result of comparison of the variable value with the predetermined threshold value, an interaction tool providing a method for manipulating the data into another interaction tool providing a different method for manipulating the same data; and a display for displaying the selectively converted interaction tool.

5. A computer system according to claim 4, wherein the display changes, in accordance with the predetermined instruction input via the input means, a displayed image of the selected interaction tool.

6. A computer system according to claim 4, wherein the predetermined instruction input via the input means is an instruction for magnifying or reducing an overall image, and the variable value is a zoom ratio of the overall image.

7. A computer system according to claim 4, wherein the interaction tool includes at least one of:

a GUI component for enabling the user to manipulate data;

means for enabling the user to directly manipulate a graphical object which is a visual representation of data; and means for providing a graphical operation implicitly assigned to input facilities of the input means.

8. A computer system according to claim 4, wherein the interaction tool includes an object having data and a method for manipulating the data.

9. A computer system according to claim 4, wherein the operation of the comparator, the selector and the display is continuously performed in response to the variable value.

10. A method for enabling a user to interactively manipulate data retained in a computer system, the method comprising the steps of:

(a) comparing a variable value with a predetermined threshold value, the variable value varying in accordance with a predetermined instruction which is input to the computer system;

(b) selecting one of a plurality of tools as a controller in accordance with a result of comparison of the variable value with the predetermined threshold value, each of the plurality of tools having a shape adapted for a specific data manipulation method, the controller enabling the user to change a value of one of the data; and (c) displaying the selected one of the plurality of tools as a controller in a display region.

11. A method for enabling a user to interactively manipulate one or more data associated with a graphical object retained in a computer system, the method comprising the steps of:

(a) comparing a variable value with a predetermined threshold value, the variable value varying in accordance with a predetermined instruction which is input to the computer system;

(b) selecting one of a plurality of tools as a controller in accordance with a result of comparison of the variable value with the predetermined threshold value, each of the plurality of tools having a shape adapted for a specific data manipulation method, the controller enabling the user to change a value of one of the data; and (c) displaying the selected one of the plurality of tools as a controller in a display region.

12. The method according to claim 11, wherein the graphical object is a building object which is drawn on a map.

13. A method for manipulating data retained in a computer system, the computer system retaining an object which has associated therewith one or more data and one or more data manipulation method for manipulating the one or more data, at least one of the one or more data manipulation method comprising the step of interacting with a user, wherein the step of interacting comprises the steps of:

(a) comparing a variable value with a predetermined threshold value, the variable value varying in accordance with a predetermined instruction which is input to the computer system;

(b) selecting one of a plurality of tools as a controller in accordance with a result of comparison of the variable value with the predetermined threshold value, each of the plurality of tools having a shape adapted for a specific data manipulation method, the controller enabling the user to change a value of one of the data; and (c) displaying the selected one of the plurality of tools as a controller in a display region.

14. The method according to claim 13, wherein the object is a schedule object to be shown on a calendar, and wherein the plurality of tools comprises a tool for controlling text data associated with the schedule object, the tool comprising one or more tools selected from the group consisting of a non-editable text box, an editable text box, an editable text box having multiple functions in word-processor-like fashion, and a word processor program.

* * * * *